United States Patent [19]
Ohashi et al.

[11] Patent Number: 5,605,177
[45] Date of Patent: Feb. 25, 1997

[54] FUEL RESERVOIR APPARATUS

[75] Inventors: Tamiyoshi Ohashi; Sukehiro Sawada, both of Aichi-ken; Osamu Hokari, Kanagawa-ken, all of Japan

[73] Assignees: Toyoda Gosei Co., Ltd., Shikasugai-gun; Isuzu Motors Limited, Shinagawa-ku, both of Japan

[21] Appl. No.: 296,803

[22] Filed: Aug. 26, 1994

[30] Foreign Application Priority Data

Aug. 30, 1993 [JP] Japan .................................. 5-214335

[51] Int. Cl.⁶ .................................................. F02M 33/02
[52] U.S. Cl. .......................... 137/587; 123/516; 123/520; 141/59; 141/312; 141/349
[58] Field of Search ............................... 123/516, 518, 123/519, 520; 141/59, 290, 312, 348, 349; 137/587

[56] References Cited

U.S. PATENT DOCUMENTS

| | | | |
|---|---|---|---|
| 4,343,281 | 8/1982 | Uozumi et al. | 123/519 |
| 4,714,172 | 12/1987 | Morris | 137/351 X |
| 5,090,459 | 2/1992 | Aoki et al. | 141/59 |
| 5,297,528 | 3/1994 | Mukai | 123/518 |
| 5,345,917 | 9/1994 | Maruyama et al. | 123/520 |

FOREIGN PATENT DOCUMENTS 3267565  11/1991  Japan .
4105959   9/1992  Japan .

*Primary Examiner*—John Rivell
*Attorney, Agent, or Firm*—Cushman, Darby & Cushman IP Group of Pillsbury Madison & Sutro LLP

[57] ABSTRACT

Fuel reservoir apparatus can maintain and control pressure within a fuel tank at a low level during an operation of an engine, and also can prevent excessive refuelling. The fuel reservoir apparatus includes the fuel tank, a canister, a fuel vapor passage, a positive pressure valve, a solenoid valve, and a closure valve. The fuel tank stores liquid fuel to be supplied to the engine of an automobile. The canister can adsorb the fuel vapor. The fuel vapor passage connects the fuel tank to the canister. The positive pressure valve is provided in the fuel vapor passage for controlling pressure within the fuel tank, using a spring force. The solenoid valve is provided in the fuel vapor passage and adapted for opening during the operation of the engine to flow the fuel vapor towards the canister. The closure valve is provided in the fuel vapor passage for closing the fuel vapor passage when fuel is supplied to the fuel tank.

12 Claims, 16 Drawing Sheets

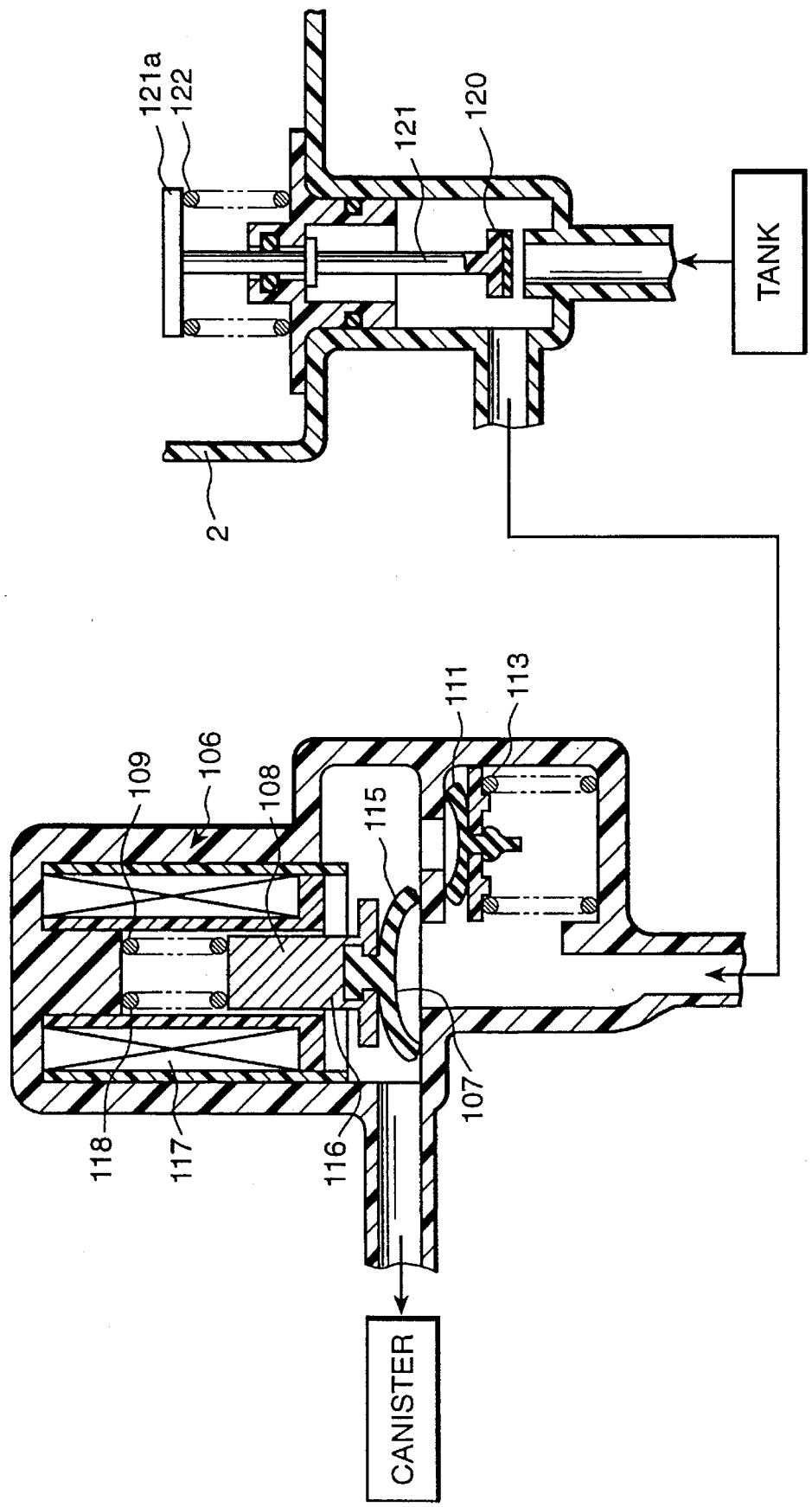

5,605,177

FUEL RESERVOIR APPARATUS

BACKGROUND OF THE INVENTION

This invention relates to a fuel reservoir apparatus mounted on an automobile for causing fuel vapor within a fuel tank to flow towards a canister.

One known fuel reservoir apparatus of the type under consideration is disclosed in Japanese Patent Unexamined Publication No. 3-267565. In this apparatus, the pressure within a tank is controlled by a check valve of the spring type.

Recently, it has been demanded to keep the pressure within a tank to a lower level, and there has been proposed a mechanism as disclosed in Japanese Utility Model Unexamined Publication No. 4-105959, in which a check valve and a solenoid valve are used in a parallel manner, and the solenoid valve is opened at the time of refuelling (that is, when a filler lid is opened) to keep and control the pressure within a tank to a low level.

However, in the former construction in which the pressure within the tank is controlled only by the check valve of the spring type, the valve opening and closing pressures are determined by a pressure difference between the opposite sides of the valve, and therefore it is difficult to adjust the pressure in a low-pressure condition. Namely, this pressure difference varies in accordance with the resistance of flow through pipes provided on the opposite sides of the valve, an amount of adsorption of fuel vapor by a canister, a variation in an amount of fuel vapor produced in the tank, etc.

In the latter construction, the solenoid valve and the check valve are used in a parallel manner, and even when a pressure within the tank is below a predetermined level, fuel vapor is conducted to a canister via the solenoid valve. However, since the solenoid valve is opened at the time of refuelling, a piping circuit communicates with the ambient atmosphere via the canister, so that a pressure within the tank is not maintained, which leads to the possibility of excessive refuelling.

SUMMARY OF THE INVENTION

With the above problems in view, it is an object of this invention to provide a fuel reservoir apparatus which can maintain and control pressure within a tank at a low level during the operation of an engine, and can prevent excessive refuelling.

The term "during the operation of the engine" is used in this specification in contrast with "during stopped of the engine", and covers "the start of the engine", "during the running of a vehicle (car)" and "during idling".

According to the present invention, there is provided a fuel reservoir apparatus comprising:

a fuel tank for storing fuel to be supplied to an engine of an automobile;

a canister for adsorbing fuel vapor;

a fuel vapor passage connected between the fuel tank and the canister;

a pressure control valve provided in the fuel vapor passage for controlling the pressure within the fuel tank, using a spring force;

valve means provided in the fuel vapor passage for opening during an operation of the engine to flow the fuel vapor towards the canister; and a closure valve provided in the fuel vapor passage for closing the fuel vapor passage at the time of supply of the fuel into the fuel tank.

In the fuel reservoir apparatus of the present invention, a closure valve is closed at the time of supplying a fuel into a fuel tank, and therefore a passageway between the fuel tank and the closure valve (the pressure control valve) is not open to the ambient atmosphere, and at the time of refuelling, the pressure is maintained, thereby preventing excessive refuelling. The closure valve is held in an open condition, except when refuelling and therefore, the solenoid valve can be opened during the operation of the engine in response to a control signal from a microcomputer or an engine start circuit, thereby keeping the pressure within the fuel tank at a low level.

During stoppage of the engine, the pressure within the fuel tank can be controlled by the spring-biased valve in a conventional manner.

Therefore, the fuel reservoir apparatus of the present invention can fully achieve those functions originally required for a fuel reservoir apparatus at the time of either one of fuel supplying, running and stoppage of the engine, and can be of a compact size.

BRIEF DESCRIPTION OF THE DRAWINGS

FIG. 16 is a schematic, cross-sectional view of an essential portion of the eighth embodiment.

DESCRIPTION OF THE PREFERRED EMBODIMENTS

A preferred embodiment of the present invention will now be described with reference to the drawings.

Figure 1:
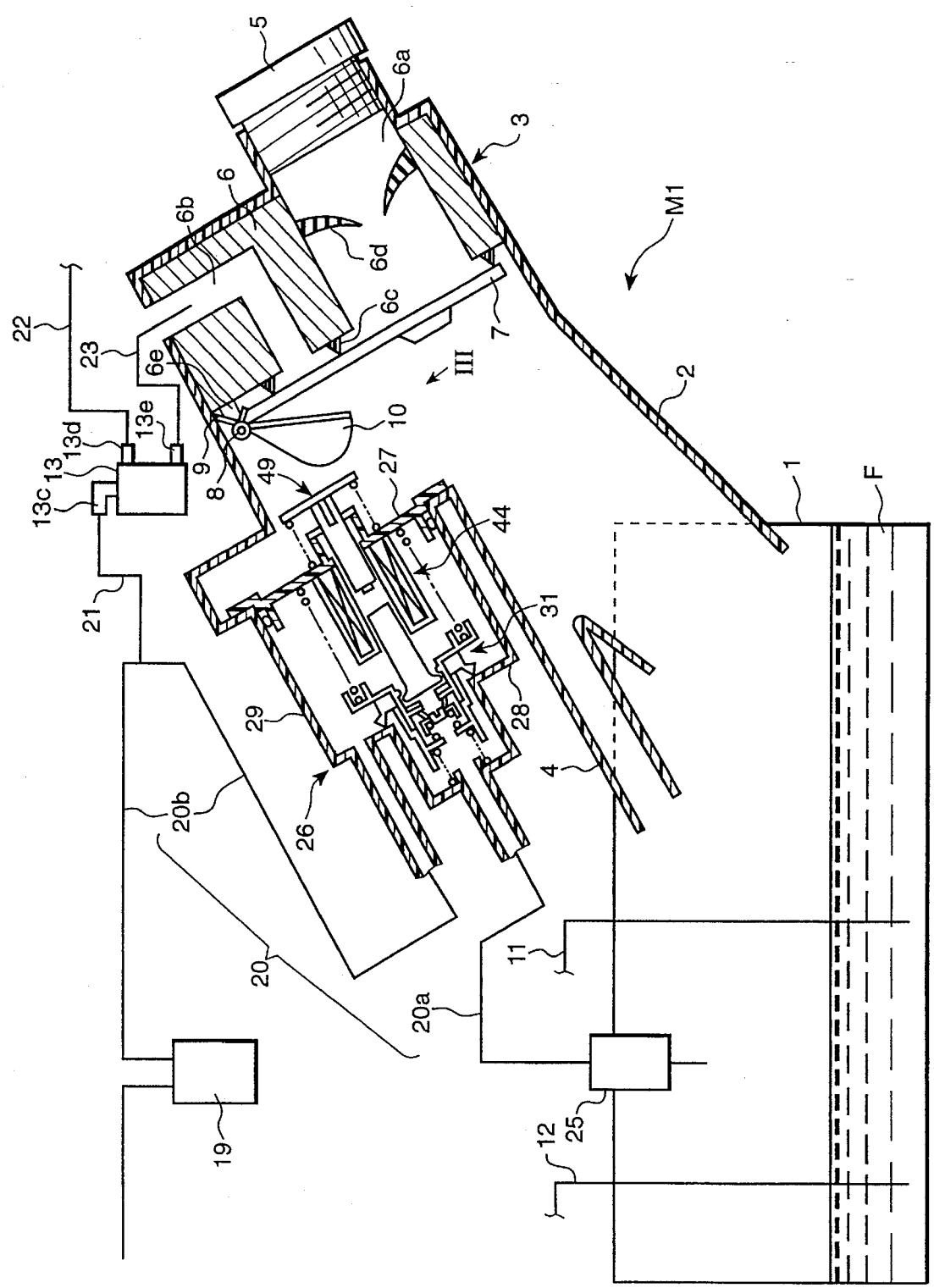
FIG. 1 is a schematic, cross-sectional view of a first embodiment of the present invention.
Figure 2:
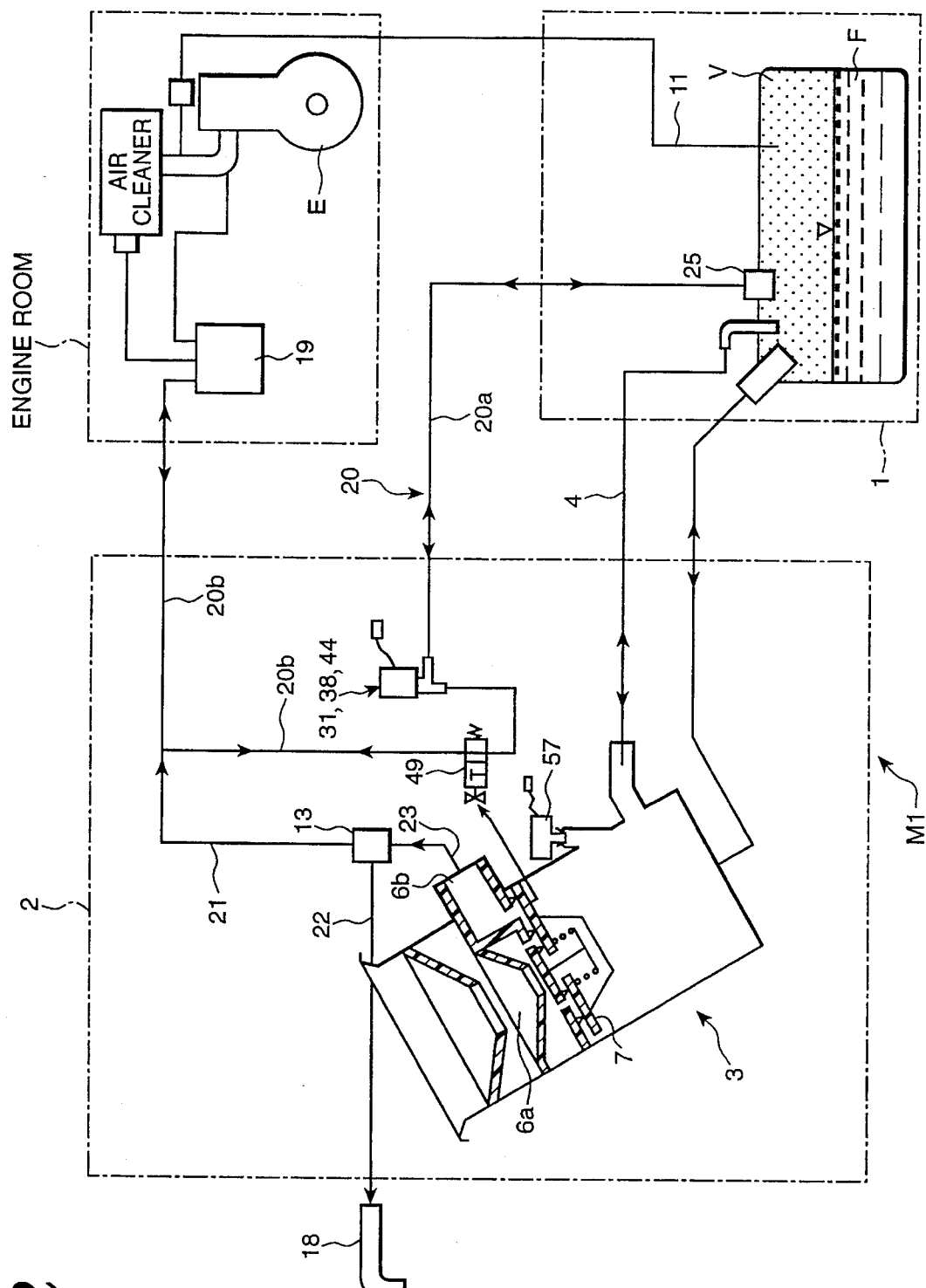
FIG. 2 is a system diagram of the first embodiment, with a fuel vapor passage shown schematically.
Figure 3:
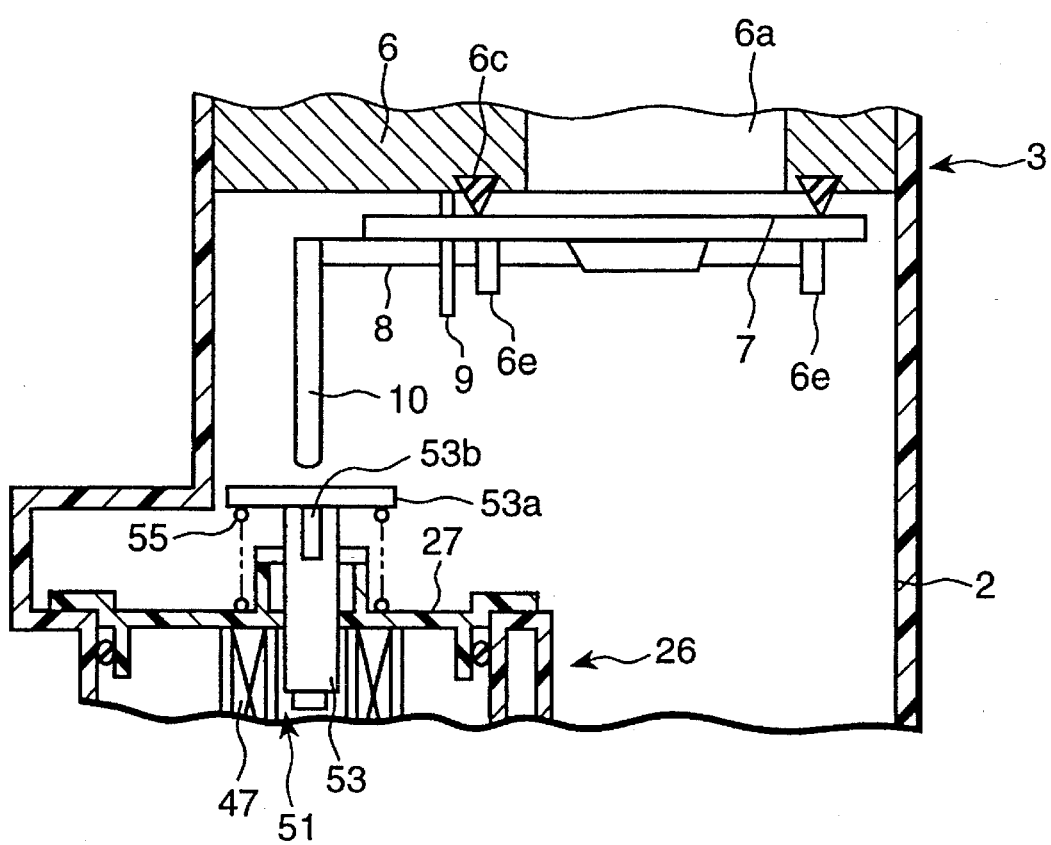
FIG. 3 is a fragmentary view as viewed in a direction of arrow III in FIG. 1 with some parts omitted for clarity of illustration.

As in a conventional construction, a fuel reservoir apparatus M1 of a first embodiment comprises a fuel tank 1 mounted on a rear portion of an automobile, and a canister 19 provided near an engine E at a front portion of the automobile, as shown in FIGS. 1 and 2. A filler neck 2, having a fuel pouring portion 3 at its upper portion, is provided above the fuel tank 1, and a fuel feed pipe 11 and a return pipe 12 are provided. A breather tube 4 connects the fuel tank 1 to the filler neck 2.

A closure portion 6, having passage holes 6a and 6b, is fixedly mounted on the fuel pouring portion 3, and a trap door 7, normally closing the passage holes 6a and 6b, is provided below the closure portion 6. A seal member 6c is provided on lower peripheral edge portions defining the passage holes 6a and 6b.

The trap door 7 is fixedly mounted on a support shaft 8 supported by bearings 6e and 6e mounted on the lower surface of the closure portion 6. A torsion spring 9 is mounted on the support shaft 8, and urges the trap door 7 in a direction to close the passage holes 6a and 6b. A cam 10 is fixedly secured to one end of the support shaft 8.

A fuel pouring gun 24 (see FIG. 6) is inserted into the passage hole 6a in the closure portion 6 for pouring liquid fuel F into the fuel tank 1. A fuel cap 5 is fitted in the upper portion of the passage hole 6a at the fuel pouring portion 3. A seal member 6d serves to form a seal between the fuel pouring gun 24 and the passage hole 6a when the fuel pouring gun 24 is inserted into the passage hole 6a.

The passage hole 6b serves as a passageway which delivers fuel vapor V produced in a large amount when supplying the liquid fuel F into the fuel tank 1 towards the canister 19, and discharges the fuel vapor V supplied in a large amount into the fuel tank 1 to the outside. The passage hole 6b is in communication with an overflow device 13.

Figure 4:
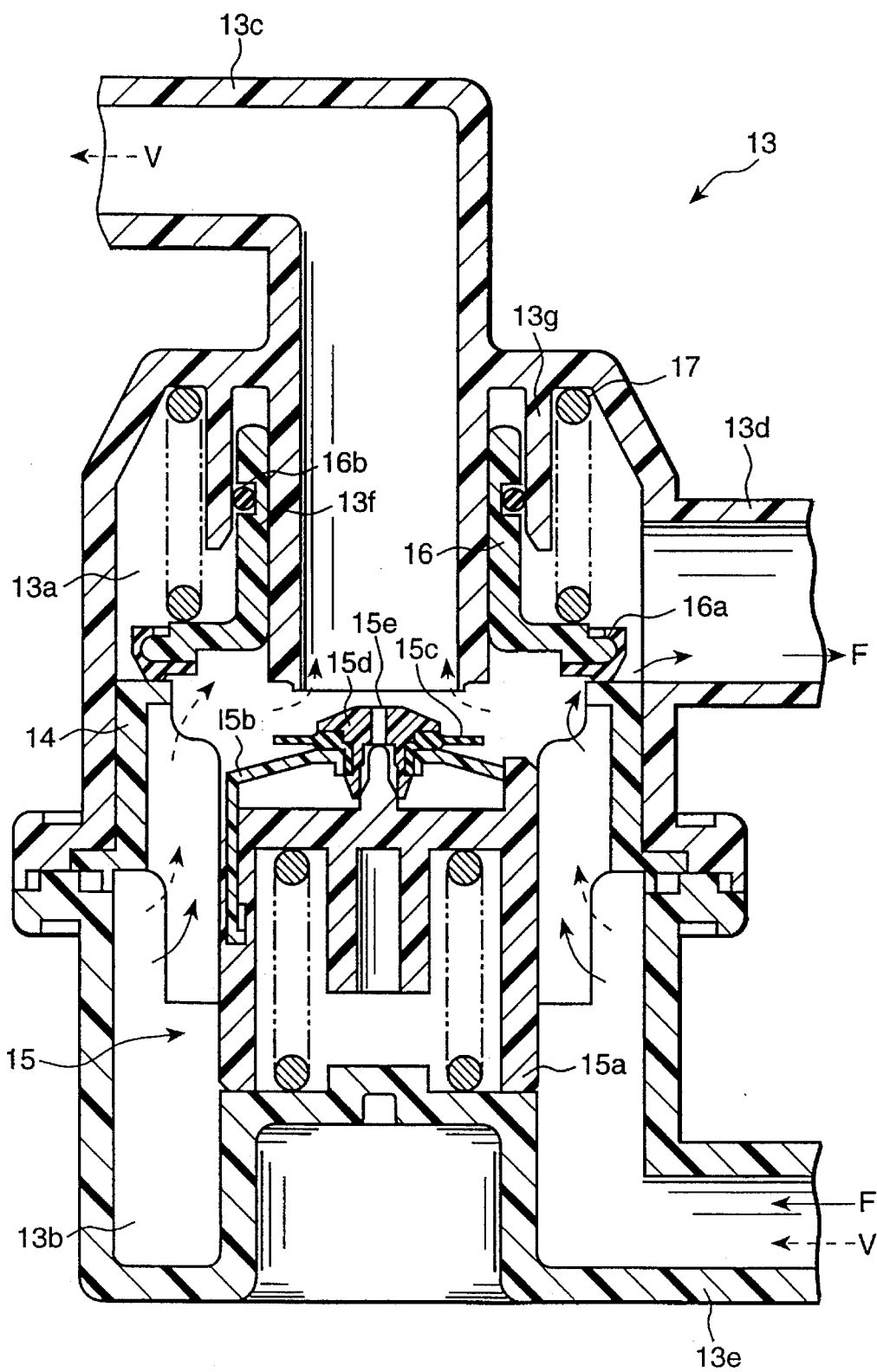
FIG. 4 is a cross-sectional view showing an overflow device employed in the first embodiment.

As shown in FIGS. 1 and 4, the overflow device 13 has two chambers, that is, upper and lower chambers 13a and 13b, nipples 13c, 13d and 13e, and a cylindrical tubular portion 13f which extends into the interior of the overflow device, and communicates with the nipple 13c. The nipple 13c is connected to a pipe 21 connected to a canister-side passageway 20b of a fuel vapor passage 20 (described later). The nipple 13d is connected to a pipe 22, and the nipple 13e is connected to a pipe 23 communicating with the passage hole 6b. The pipe 22 is connected to a downwardly-open tube 18 which is fixedly mounted on an inner side of a fuel lid (not shown).

A float valve 15 is provided within the lower chamber 13b, and is adapted to be guided by a guide 14 for upward and downward movement, the guide 14 being fixedly mounted on an entire inner peripheral surface of the lower chamber 13b below the nipple 13d. To ensure that valve opening after the valve closing can be effected smoothly, this float valve 15 comprises a first float 15a, and a second float 15b mounted on an outer peripheral surface of the first float 15a adapted for upward and downward movement. A valve member 15c is secured to the second float 15b by a clip 15d having a small hole 15e.

A valve plate 16 is provided within the upper chamber 13a, and is urged downwardly by a coil spring 17. The valve plate 16 has a seal member 16a adapted for abutting against an upper surface of the guide 14 over an entire periphery thereof, and a seal member 16b engaged with an entire inner peripheral surface of a tubular portion 13g. Normally, the valve plate 16 closes the passageway leading to the tube 18.

When the liquid fuel F flows into the overflow device 13 via the passage hole 6b, the pipe 23 and the nipple 13e at the time of refuelling, the float valve 15 is moved upwardly by the liquid fuel F to close the tubular portion 13f, and the valve plate 16 moves upwardly against the bias of the coil spring 17 to disengage the seal member 16a from the guide 14. In the case of excessive refuelling, the liquid fuel F flows via the nipple 13d and the pipe 22, and drops from the tube 18. When only the liquid vapor V flows into the overflow device 13 via the passage hole 6b, the pipe 23 and the nipple 13e during refuelling, this liquid vapor V flows into the pipe 21 via the tubular portion 13f and the nipple 13c.

The canister 19 communicates with the upper portion of the fuel tank 1 via the fuel vapor passage 20 of a predetermined piping arrangement in which a valve chamber 26 is provided. As in a conventional construction, a fuel cut-off valve 25, having therein a float valve for preventing the liquid fuel F from flowing into the passage 20, is provided in a tank-side passageway 20a of the passage 20.

Figure 5:
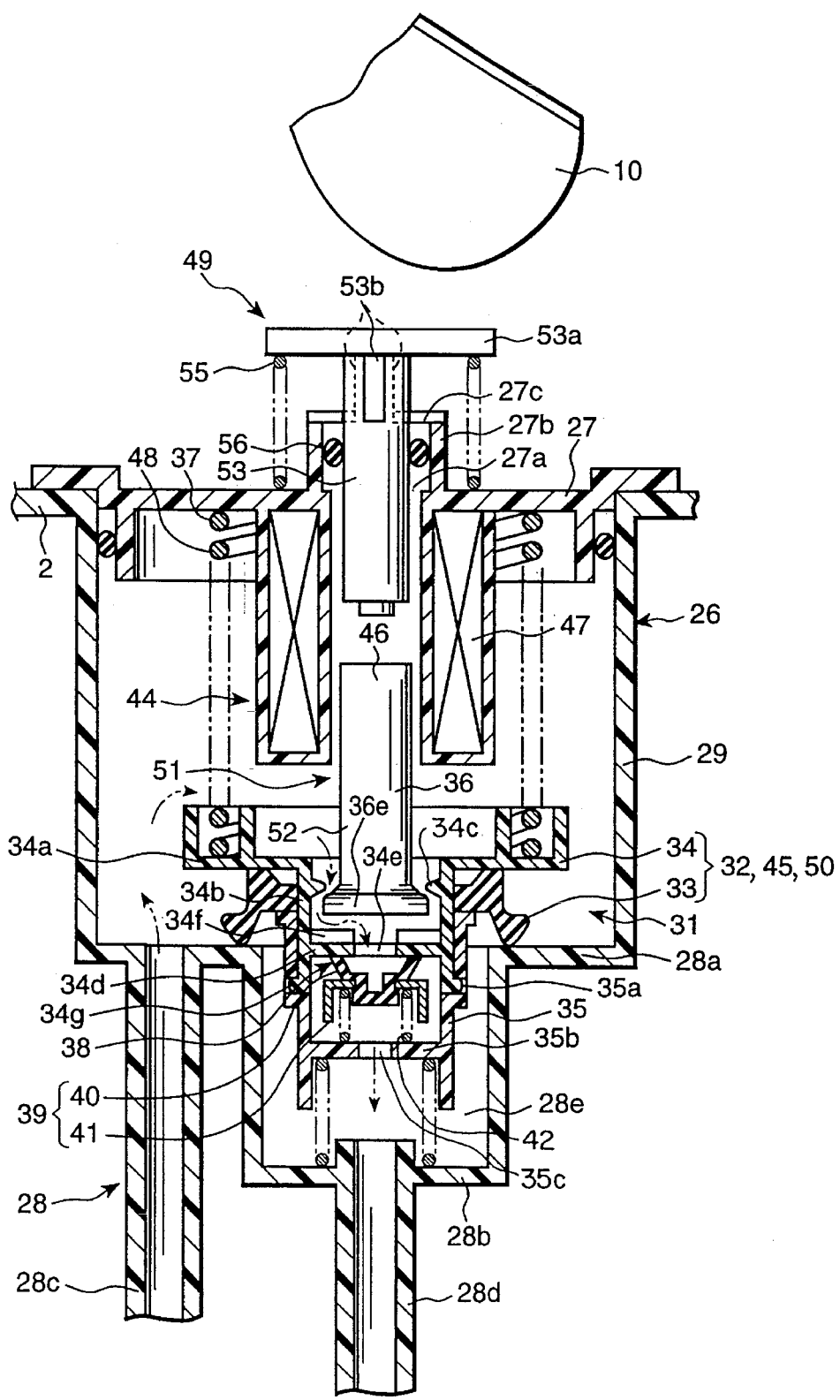
FIG. 5 is a cross-sectional view of an essential portion of the first embodiment.

The valve chamber 26 is provided in the filler neck 2, and is formed by opposed top and bottom walls 27 and 28 and a side or peripheral wall 29 of a cylindrical shape interconnecting the top and bottom walls 27 and 28, as best shown in FIG. 5, a passage hole 27a being formed through the top wall 27. The bottom wall 28 comprises an upper bottom wall portion 28a and a lower bottom wall portion 28b defining a bottom of a recess portion 28e extending downwardly from the upper bottom wall portion 28a. A nipple 28d, connected to the tank-side passageway 20a of the vapor fuel passage 20, is formed on the lower bottom wall portion 28b while a nipple 28c, connected to the canister-side passageway 20b of the vapor fuel passage 20, is formed on the upper bottom wall portion 28a.

Within the valve chamber 26, a positive pressure valve 31, a negative pressure valve 38, a solenoid valve 44 and a closure valve 49 are provided between the lower bottom wall portion 28b and the top wall 27 in an assimilated manner.

The positive pressure valve 31 is a pressure control valve which keeps, together with the negative pressure valve 38, pressure within the fuel tank 1 in a predetermined range. This positive pressure valve 31 comprises a valve member 32, which is engageable with an entire peripheral edge portion of the recess portion 28e extending from the upper bottom wall portion 28a to the lower bottom wall portion 28b to close the recess portion 28e, a valve stem 36 supporting the valve member 32, and a coil spring 37 urging the valve member 32 in a direction to close the recess portion 28e.

As shown in FIG. 5, the valve member 32 comprises an annular valve element 33 of rubber for sealing engagement with the entire peripheral edge portion of the recess portion 28e, a support plate 34 supporting the valve element 33, and a clip 35 retaining the valve element 33 on the support plate 34.

The support plate 34 has an upper surface serving as a spring seat 34a for the coil spring 37, and has a cylindrical tubular portion 34b extending from a lower surface thereof. A plurality of projections 34c are formed on an inner peripheral surface of the tubular portion 34b at an upper portion thereof, and a partition wall 34d having a through hole 34e is formed on the inner peripheral surface of the tubular portion 34b at a lower portion thereof. A plurality of projections 34f, vertically spaced from one another, are formed on an upper surface of the partition wall 34d. A plurality of retaining projections 34g are formed on an outer peripheral surface of the tubular portion 34b at a lower end thereof.

The clip 35 is of a generally cylindrical shape, and has at its upper portion, a plurality of retaining holes 35a which retain the retaining projections 34g of the support plate 34 at their peripheral edges, respectively. A partition wall 35b having a through hole 35c is formed on an inner peripheral surface of the clip 35 at a lower portion thereof. The valve element 33 is first mounted on the outer peripheral surface of the tubular portion 34b formed on the lower surface of the spring seat 34a of the support plate 34, and then the clip 35 is mounted on the tubular portion 34b, with the retaining projections 34g being retainingly engaged respectively with the peripheral edges of the retaining holes 35a, thereby supporting the valve element 33 on the support plate 34.

The valve stem 36 has an enlarged portion 36a at its lower end, and the enlarged portion 36a is disposed between the projections 34c and the projections 34f in spaced relation to the inner peripheral surface of the tubular portion 34b, so that the enlarged portion 36a is prevented from withdrawal from the tubular portion 34b.

The negative pressure valve 38 is provided between the partition wall 34d of the support plate 34 and the partition wall 35b of the clip 35, and comprises a valve plate 39 serving as a valve member capable of closing the through hole 34e, and a coil spring 42 urging the valve plate 39 towards the through hole 34e. The valve plate 39 comprises a dish-shaped valve element 40 of rubber, and a support plate 41 supporting the valve member 40. This negative pressure valve 38 is mounted in position when retaining the clip 35 on the support plate 34.

The solenoid valve 44 is operated or activated in response to an electrical signal, fed from a control unit (not shown) mounted on the automobile, during the running of the automobile. The solenoid valve 44 comprises a valve member 45, a valve stem 46 and a coil spring 48 which also serve respectively as the valve element 32, the valve stem 36 and the coil spring 37 of the positive pressure valve 31. Thus, these parts are common to the positive pressure valve 31 and the solenoid valve 44. By exciting an electromagnetic coil 47 embedded in that portion of the valve chamber 26 formed on the lower surface of the top wall 27 around the peripheral edge of the passage hole 27a in the top wall 27, the valve stem 46 is moved away from the recess portion 28e to disengage the valve member 45 from the peripheral edge portion of the recess portion 28e.

When the trap door 7 is opened, the closure valve 49 is pressed by the cam 10 to close the recess portion 28e. The closure valve 49 comprises a valve member 50 and a valve stem 51. The valve member 50 and a portion 52 of the valve stem 51 are defined respectively by the valve member 32, 45 and the valve stem 36, 46 of the positive pressure valve 31 and the solenoid valve 44. Thus, these parts are common to the positive pressure valve 31, the solenoid valve 44 and the closure valve 49.

The valve stem 51 of the closure valve 49 comprises the first valve stem 52 and a second valve stem 53 extending upwardly through the passage hole 27a in the top wall 27 of the valve chamber. The second valve stem 53 has a flange-like press portion 53a of a larger diameter formed at an upper end thereof, and a plurality of engagement grooves 53b formed in an outer peripheral surface thereof at its upper portion adjacent to the press portion 53a. A coil spring 55, urging the second valve stem 53 upwardly, is interposed between a lower surface of the press portion 53a and the top wall 27. A cylindrical tubular portion 27b is formed on the top wall 27 around the peripheral edge of the passage hole 27a, and extends upwardly therefrom. A plurality of hooks 27c, formed on an upper end of the tubular portion 27b, are engaged respectively in the engagement grooves 53b in the second valve stem 53, thus limiting the upward movement of the second valve stem 53 urged by the coil spring 55.

In this closure valve 49, when the press portion 53a of the valve stem 51 (the second valve stem 53) is pressed by the cam 10, the second valve stem 53 moves downwardly against the bias of the coil spring 55 to be brought into engagement with the first valve stem 52 to press the same, so that the valve member 50 closes the recess portion 28e, thereby shutting-off the fuel vapor passage 20.

A coil spring 43 urges the valve members 32, 45, 50 upwardly, and serves as a damper member when the closure valve 49 is operated. The coil spring 55 serves to prevent the second valve stem 53 from rattling. A seal member 56 serves to form an air-tight seal between the second valve stem 53 and the passage hole 27a.

Figure 6:
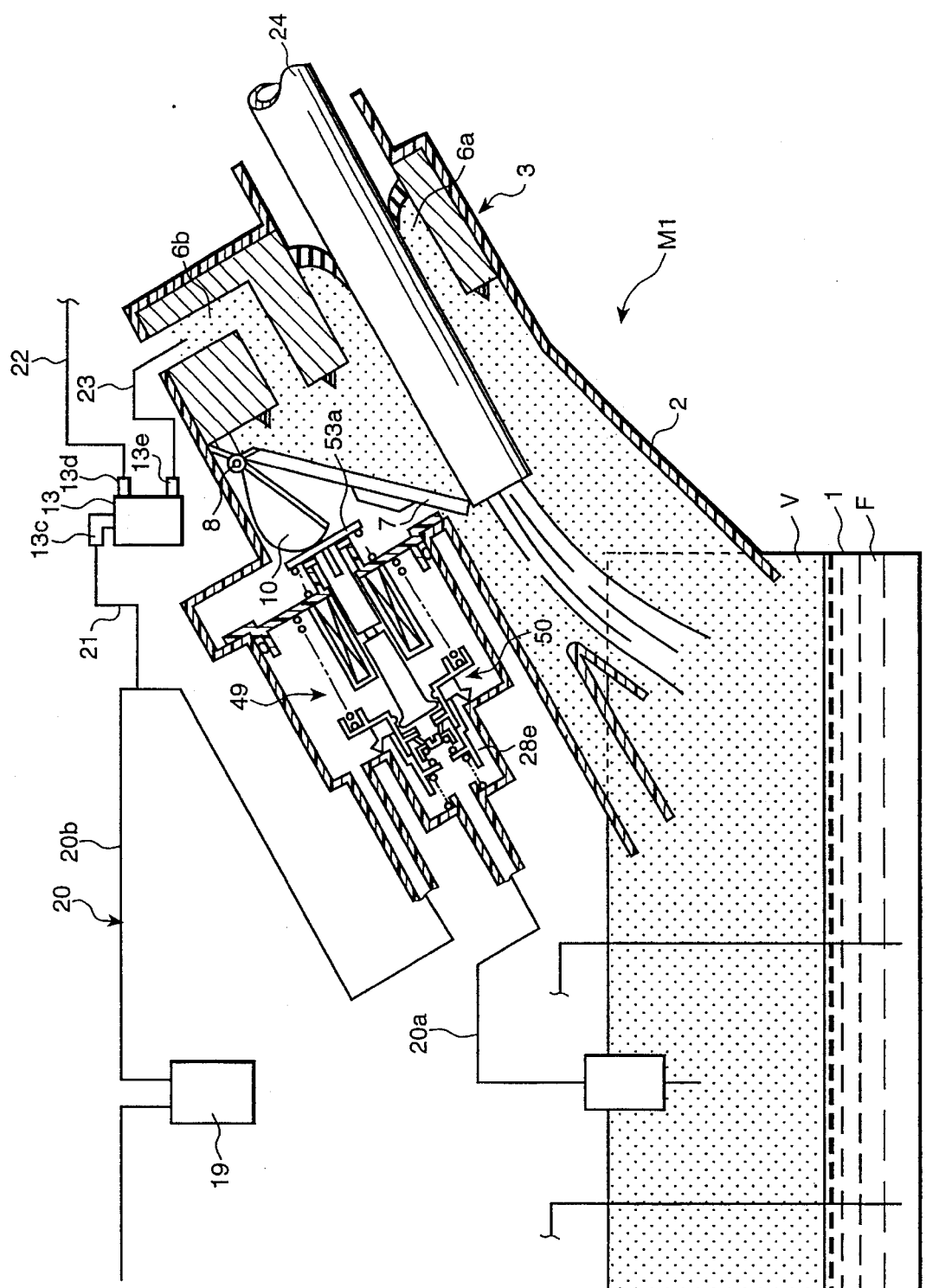
FIG. 6 is a schematic, cross-sectional view of the first embodiment, showing a state at the time of supplying liquid fuel into a fuel tank.
Figure 7:
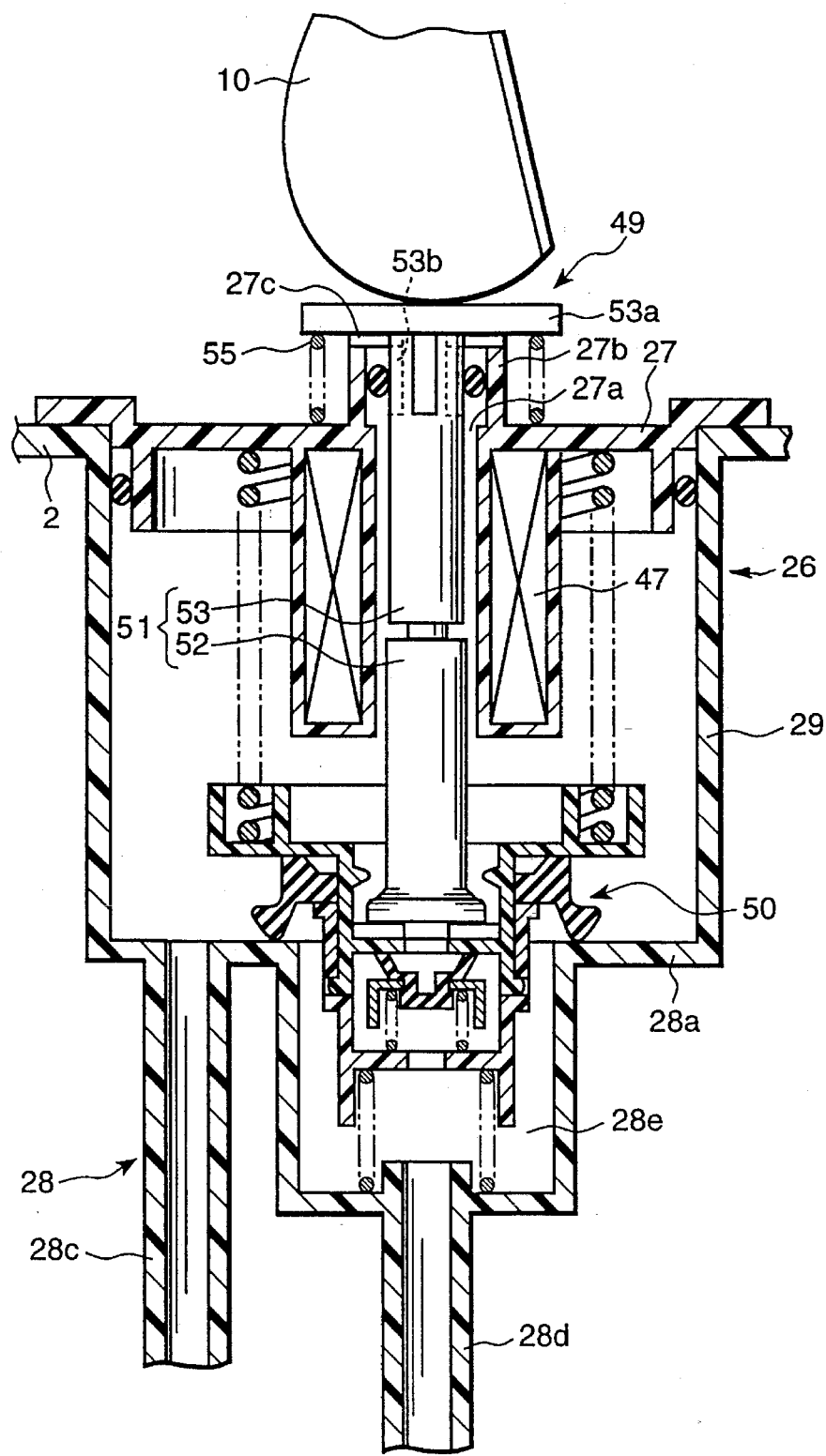
FIG. 7 is a cross-sectional view of an essential portion of the first embodiment at the time of refuelling.

In the fuel reservoir apparatus M1 of this first embodiment, when the liquid fuel F is to be supplied into the fuel tank 1 after removing the fuel cap 5, the fuel pouring gun 24 is inserted into the passage hole 6a in the fuel pouring portion 3, so that the trap door 7 is pressed by the fuel pouring gun 24 to be opened, as shown in FIG. 6. As a result, the cam 10, fixedly mounted on the support shaft 8 of the trap door 7, presses down the press portion 53a of the closure valve 49, so that the valve member 50 of the closure valve 49 closes the recess portion 28e to shut-off the fuel vapor passage 20, as shown in FIG. 7. When the trap door 7 is thus opened, the passage hole 6b in the closure portion 6 is opened.

In this condition, when the liquid fuel F is supplied from the fuel pouring gun 24, the fuel vapor V is produced in a large amount within the fuel tank 1 to be fed to the overflow device 13 via the filler neck 2, the passage hole 6b, the pipe 23 and the nipple 13e, and then flows into the canister 19 via the tubular portion 13f (see FIG. 4) of the overflow device 13, the nipple 13c, the pipe 21 and the canister-side passageway 20b of the fuel vapor passage 20. If excessive refuelling should occur as a result of malfunction of an automatic stop device of the fuel pouring gun 24 with the result that the excess liquid fuel F flows into the overflow device 13 via the passage hole 6b, the pipe 23 and the nipple 13e, the float valve 15 is moved upward by this liquid fuel F to close the tubular portion 13f, and the valve plate 16 moves upward against the bias of the coil spring 17 to disengage the seal member 16a from the guide 14, so that the liquid fuel F flows through the nipple 13d and the pipe 22, and drops from the tube 18.

Then, the supply of the liquid fuel F into the fuel tank 1 is stopped, and the fuel pouring gun 24 is withdrawn from the passage hole 6a, and the fuel cap 5 is attached to the fuel pouring portion 3. Upon stopping the engine in this condition, if a pressure within the fuel tank 1 reaches a level above a predetermined positive pressure, the valve member 32 is disengaged from the peripheral edge portion of the recess portion 28e against the bias of the coil spring 37, so that fuel vapor V within the fuel tank 1 is conducted to the canister 19 sequentially via the tank-side passageway 20a, the nipple 28d, the recess portion 28e, the nipple 28c and the canister-side passageway 20b, as indicated by solid-line arrows in FIG. 8.

Figure 8:
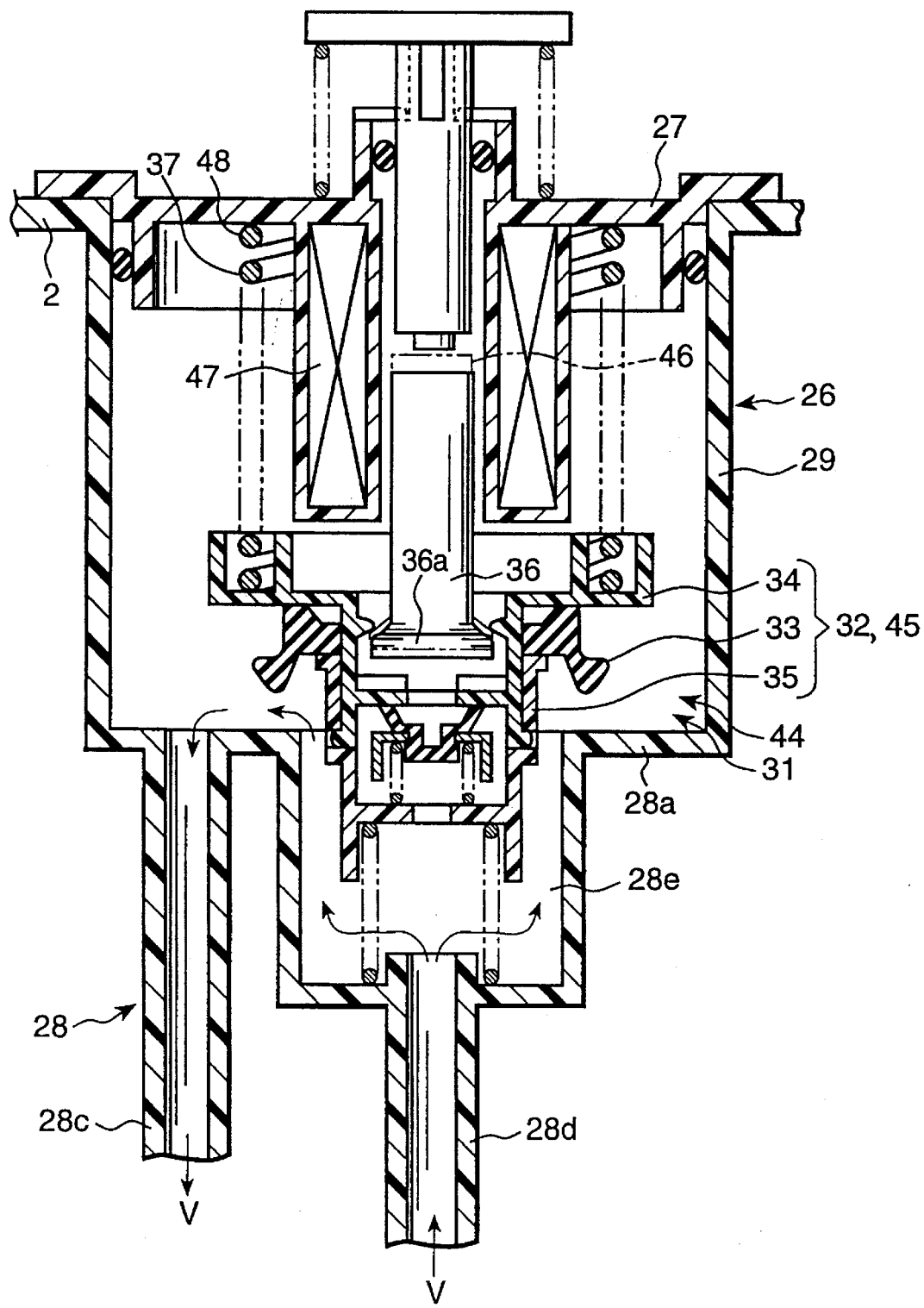
FIG. 8 is a cross-sectional view of an essential portion of the first embodiment, showing an operation in which a positive pressure condition within the fuel tank above a predetermined level is removed.

During the operation of the engine, the solenoid valve 44 is operated to lift the valve stem 46 against the bias of the coil spring 48, and therefore the valve member 45 is disengaged from the peripheral edge portion of the recess portion 28e, so that as in the operative condition of the positive pressure valve 31, fuel vapor V within the fuel tank 1 is conducted to the canister 19 sequentially via the tank-side passageway 20a, the nipple 28d, the recess portion 28e, the nipple 28c and the canister-side passageway 20b, as indicated by the solid-line arrows in FIG. 8. The solenoid valve 44 may be designed to be opened in response to a signal from a speed meter or the like only during the running of the vehicle, and this can be applied also to the other embodiments of the invention described below.

When pressure within the fuel tank 1 becomes negative below the atmospheric pressure, the valve plate 39 of the negative pressure valve 38 opens the through hole 34e against the bias of the coil spring 42, so that gas (the atmosphere) on the canister (19) side is conducted into the fuel tank 1 sequentially via the canister-side passageway 20b, the nipple 28c, the through hole 34e, the recess portion 28e, the nipple 28d and the tank-side passageway 20a, as indicated by dots-and-dash arrows in FIG. 5.

In the fuel reservoir apparatus M1 of the first embodiment, a pressure sensor 57 can be provided at the fuel tank 1, the fuel pouring portion 3 or other portion so that it can be confirmed whether or not a pressure within the fuel tank 1 is kept at a predetermined pressure. With this construction, if the result of this detection indicates that pressure within the fuel tank 1 is outside a predetermined range, an alarm lamp or the like is operated to warn the operator (driver) of this abnormal condition.

As described above, in the fuel reservoir apparatus M1 of the first embodiment, at the time of supplying the fuel into the fuel tank 1, the trap door 7 causes the closure valve 49 to shut off the tank-side passageway 20a of the fuel vapor passage 20, and the liquid fuel F, tending to open the pressure control valves 31 and 38 and the solenoid valve 44 to enter into the canister-side passageway 20b, can be positively stopped at the position where the closure valve 49 is provided, thereby positively preventing the liquid fuel F from flowing towards the canister 19.

When the liquid fuel F flows into the overflow device 13, there is a possibility that the liquid fuel F flows into the canister-side passageway 20b of the fuel vapor passage 20; however, an amount of flow of the liquid fuel F is reduced by a breather flow structure within the filler neck 2. Further, the float valve 15 of the overflow device 13 prevents the liquid fuel F from flowing towards the canister-side passageway 20b, and therefore there is no fear that the liquid fuel F will flow from the overflow device 13 to the canister-side passageway 20b, so that the advantageous effects of the present invention will not be affected.

In the fuel reservoir apparatus M1 of the first embodiment, the valve member 32, 45, 50, as well as the valve stem 36, 46, 52, is common to the positive pressure valve 31, the solenoid valve 44 and the closure valve 49. In addition, the coil spring 37, 48 is common to the positive pressure valve 31 and the solenoid valve 44. Therefore, the number of the component parts is reduced. And besides, the positive pressure valve 31, the negative pressure valve 38, the solenoid valve 44 and the closure valve 49 can be mounted beforehand with respect to the top wall 27 in an assimilated manner, and therefore the time and labor required for the assembling operation can be reduced.

With respect to the process of mounting the associated parts on the top wall 27, the coil spring 55 is mounted around the tubular portion 27b on the top wall 27, and the seal member 56 is mounted on the inner periphery of this tubular portion 27b, and then the second valve stem 53 is inserted into the passage hole 27a from above, so that the hooks 27c are engaged in the engagement grooves 53b, respectively, thus mounting the second valve stem 53 on the top wall 27.

The valve element 33 is mounted around the tubular portion 34b of the support plate 34, and the valve plate 39, which has the valve element 40 mounted on the support plate 41, and the coil spring 42 are interposed between the partition walls 34d and 35b. In this condition, the retaining projections 34g are engaged respectively with the peripheral edges of the retaining holes 35a in the clip 35, thereby supporting the valve element 33 and the negative pressure valve 38 on the support plate 34 through the clip 35. Then, the valve stem 36 is mounted on the valve member 32, with the enlarged portion 36a engaged with the projections 34c of the support plate 34.

Thereafter, the coil spring 37 is mounted between the spring seat 34a and the lower surface of the top wall 27, and the valve stem 36, having the valve member 32 retained thereon, is inserted into the passage hole 27a from below. The coil spring 43 is interposed between the lower bottom wall portion 28b and the partition wall 35b, and the outer peripheral edge portion of the top wall 27 is fusingly bonded or fixedly secured to that portion of the side wall 29 of the valve chamber 26 disposed close to the filler neck 2. Thus, the mounting of the positive pressure valve 31 and the other associated parts on the filler neck 2 is completed.

Figure 9:
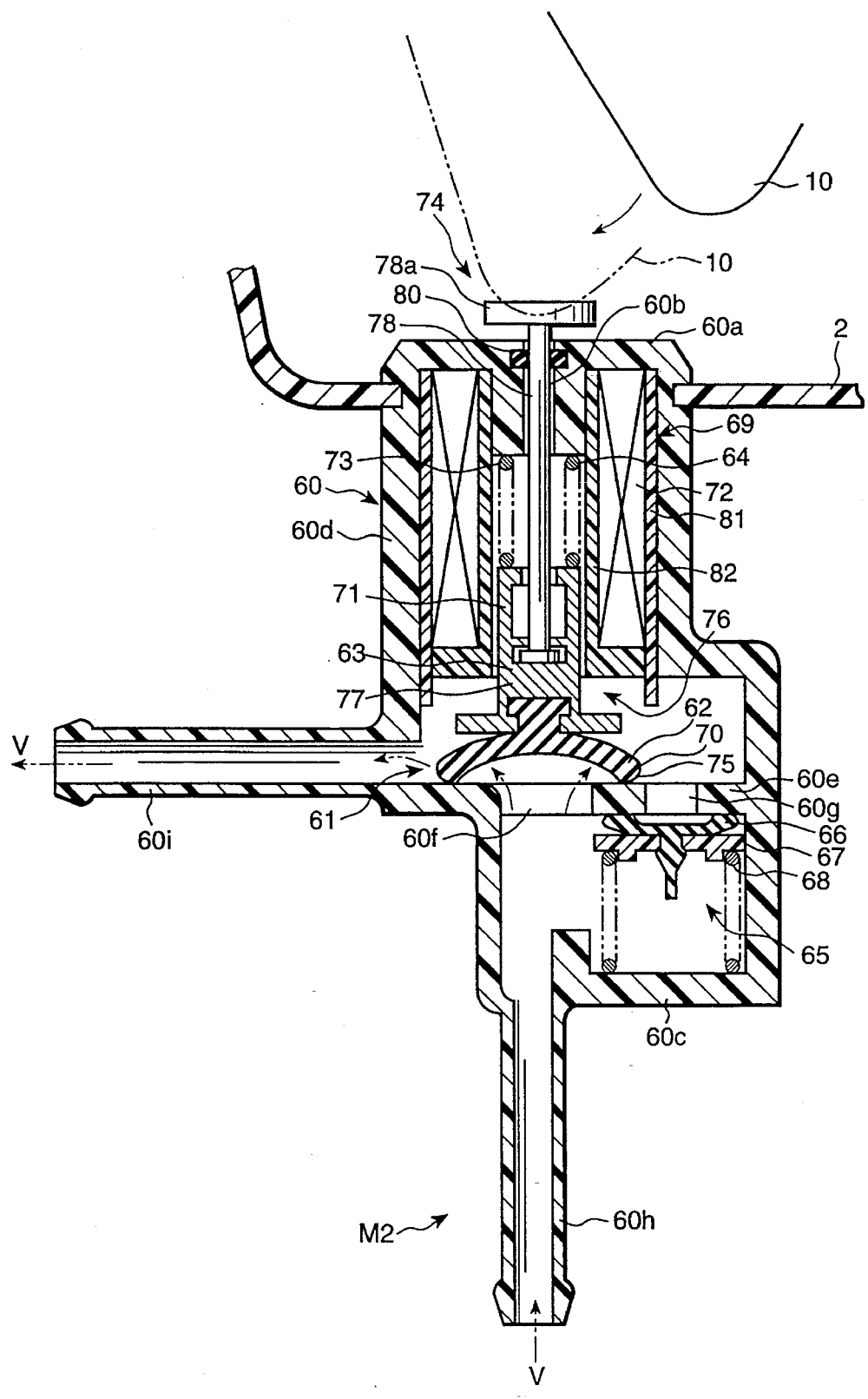
FIG. 9 is a schematic, cross-sectional view of an essential portion of a second embodiment of the invention.

In the fuel reservoir apparatus M1 of the first embodiment, although the negative pressure valve 38 is generally integrally incorporated in the positive pressure valve 31, the negative pressure valve 65 (FIG. 9) may be mounted separately from the positive pressure valve 31 as in a fuel reservoir apparatus M2 shown in FIG. 9.

In the fuel reservoir apparatus M2 of a second embodiment, a valve chamber 60 is fixedly provided on the filler neck 2, and the valve chamber 60 is defined by a top wall 60a, a bottom wall 60c and a side wall 60d interconnecting peripheral edges of the top and bottom walls 60a and 60c. The interior of this valve chamber is divided into a pair of upper and lower chambers by a partition wall 60e having a passage hole 60f and a through hole 60g. A nipple 60h, connected to the tank-side passageway 20a of the fuel vapor passage 20, is formed on the bottom wall 60c. Further, a nipple 60i, connected to the canister-side passageway 20b of the fuel vapor passage 20, is formed on that portion of the side wall 60d disposed above the partition wall 60e.

A positive pressure valve 61 comprises a valve member 62 capable of closing the passage hole 60f, a valve stem 63 supporting the valve member 62 at its lower end, and a coil spring 64 urging the valve member 62 downwardly. A negative pressure valve 65 comprises a valve member 66 capable of closing the through hole 60g, a support plate 67 supporting the valve member 66, and a coil spring 68 urging the valve member 66 upwardly.

A solenoid valve 69 comprises a valve member 70, a valve stem 71 and a coil spring 73 which also serve as the valve member 62, the valve stem 63 and the coil spring 64 of the positive pressure valve 61, respectively. By exciting an electromagnetic coil 72, the valve member 70 is disengaged from a peripheral edge portion (valve seat) of the passage hole 60f against the bias of the coil spring 73. The electromagnetic coil 72 is fixedly mounted on the lower surface of the top wall 60a of the valve chamber 60 through spacers 81 and 82 of a generally cylindrical shape.

A closure valve 74 comprises a valve member 75 and a first valve stem 77 which also serve as the valve member 62 and the valve stem 63 of the positive pressure valve 61, respectively. A second valve stem 78, which cooperates with the first valve stem 77 to form a valve stem 76 for the closure valve 74, is connected to an upper portion of the first valve stem 77 against withdrawal, and is projected upwardly from a passage hole 60b in the top wall 60a. A press portion 78a capable of engaging with the cam 10 is formed on an upper end of the second valve stem 78. A seal member 80 forms an air-tight seal between the second valve stem 78 and the passage hole 60b.

In the fuel reservoir apparatus M2 of the second embodiment, at the time of refuelling, the trap door 7 is rotated to cause the cam 10 to press the press portion 78a, so that the valve stem 76 of the closure valve 74 moves downwardly to cause the valve member 75 to close the passage hole 60f, thereby shutting off the fuel vapor passage 20.

When a pressure within the fuel tank 1 increases upon stopping the engine, the valve member 62 of the positive pressure valve 61 is disengaged from the peripheral edge portion of the passage hole 60f against the bias of the coil spring 64, so that fuel vapor V within the fuel tank 1 flows towards the canister 19 via the tank-side passageway 20a of the fuel vapor passage 20, the nipple 60h, the passage hole 60f, the nipple 60i and the canister-side passageway 20b of the fuel vapor passage 20, as indicated by dots-and-dash arrows in FIG. 9.

During the operation of the engine, the electromagnetic coil 72 is excited to cause the valve stem 71 to move upwardly against the bias of the coil spring 73, so that the valve member 70 is disengaged from the peripheral edge portion of the passage hole 60f. Therefore, as in the operative condition of the positive pressure valve 61, fuel vapor V within the fuel tank 1 flows towards the canister 19, thereby keeping pressure within the fuel tank 1 at a low level.

When pressure within the fuel tank 1 becomes negative, below the atmospheric pressure, the valve member 66 of the negative pressure valve 65 is disengaged from the peripheral edge portion (valve seat) of the through hole 60g against the bias of the coil spring 68, so that the atmosphere at the canister side flows into the fuel tank 1 via the canister-side passageway 20b of the fuel vapor passage 20, the nipple 60i, the through hole 60g, the nipple 60h and the tank-side passageway 20a of the fuel vapor passage 20, thereby cancelling the negative pressure condition of the fuel tank 1.

Therefore, in the fuel reservoir apparatus M2 of the second embodiment, similar advantageous effects as described above can be achieved. Further, the valve member 62, 70, 75 as well as the valve stem 63, 71 and 77 are common to the positive pressure valve 61, the solenoid valve 69 and the closure valve 74, and also the coil spring 64, 73 is common to the positive pressure valve 61 and the solenoid valve 69. Therefore, the number of the component parts is reduced.

Figure 10:
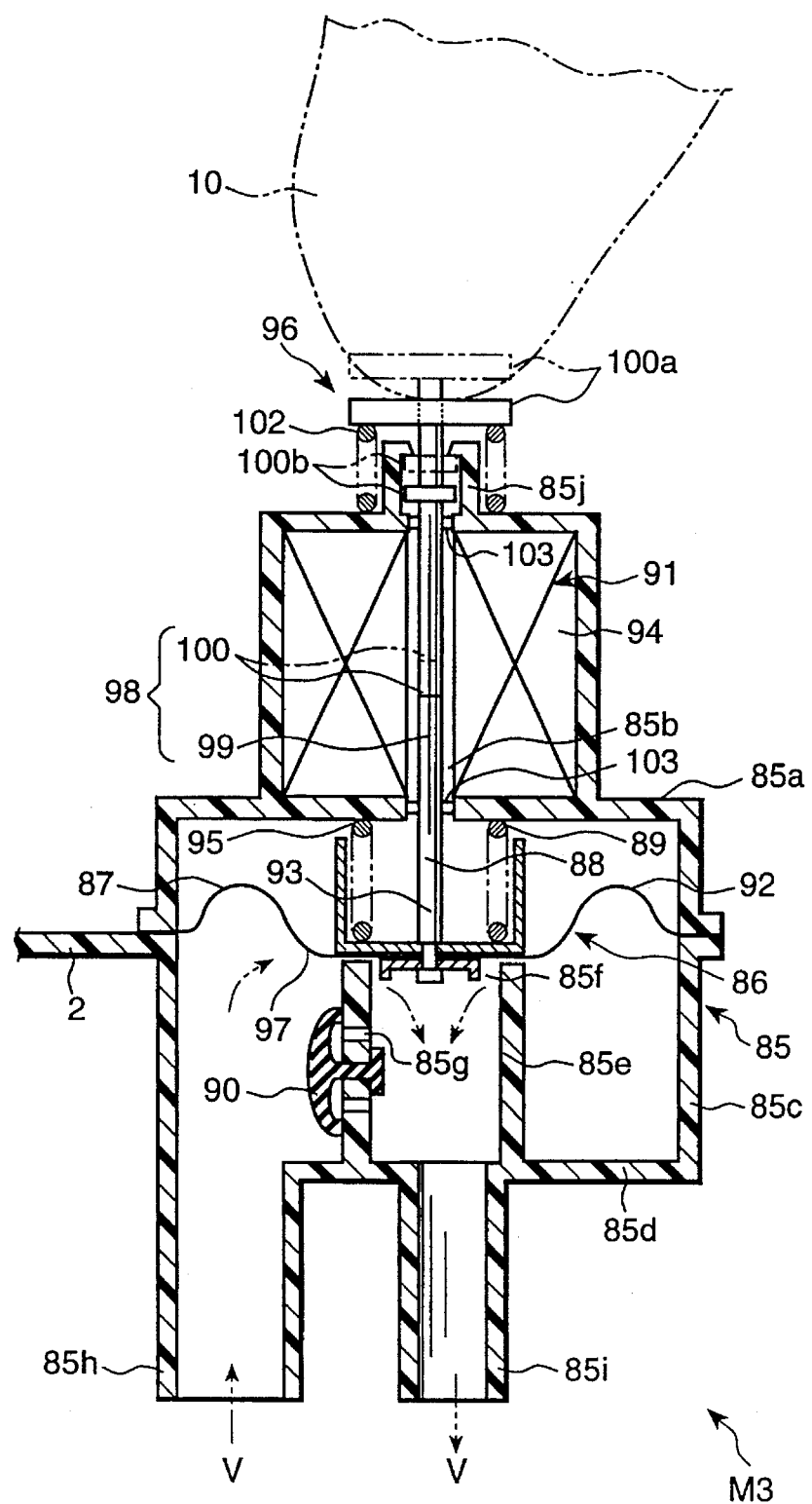
FIG. 10 is a cross-sectional view of an essential portion of a third embodiment of the invention at the time of refuelling.

A fuel reservoir apparatus M3 of a third embodiment shown in FIG. 10 achieves similar effects as described in the second embodiment. In this apparatus M3 of the third embodiment, a valve member 87 of a positive pressure valve 86 comprises a diaphragm valve, and a negative pressure valve 90 comprises an umbrella-shaped member of rubber.

In this fuel reservoir apparatus M3, a valve chamber 85 provided in the filler neck 2 is defined by a top wall 85a, a side wall 85c of a cylindrical shape extending downwardly from a lower surface of the top wall 85a at a peripheral edge thereof, and a bottom wall 85d having nipples 85h and 85i extending therefrom. A partition wall 85e of a generally cylindrical shape is formed on an upper surface of that portion of the bottom wall 85d at which the nipple 85i is formed.

The nipple 85h is connected to the tank-side passageway 20a of the fuel vapor passage 20, and the nipple 85i is connected to the canister-side passageway 20b of the fuel vapor passage 20. The negative pressure valve 90 is mounted on a predetermined portion of the partition wall 85e, and a through hole 85g is formed through that portion of the partition wall 85e which is covered by an umbrella-like lip of the negative pressure valve 90.

The positive pressure valve 86 comprises the valve member 87 in the form of a diaphragm valve, a valve stem 88 supporting the valve member 87, and a coil spring 89 urging the valve member 87 in a direction to close a passage hole 85f defined by an inner peripheral surface of the partition wall 85e.

A solenoid valve 91 comprises a valve member 92, a valve stem 93 and a coil spring 95 which also serve as the valve member 87, the valve stem 88 and the coil spring 89 of the positive pressure valve 86, respectively. By exciting an electromagnetic coil 94 mounted on the upper surface of the top wall 85a, the valve member 92 is caused to open the passage hole 85f against the bias of the coil spring 95.

A closure valve 96 comprises a valve member 97 and a first valve stem 99 of a valve stem 98 which also serve as the valve member 87 and the valve stem 88 of the positive pressure valve 86, respectively. The valve stem 98 comprises the first valve stem 99, and a second valve stem 100 extending upwardly through a passage hole 85b in the top wall 85a. The second valve stem 100 has a disk-shaped press portion 100a formed at its upper end which press portion is adapted to be pressed by the cam 10, and an engagement projection 100b engageable with a hook portion 85j extending from that portion around an upper peripheral edge of the passage hole 85b. A compression coil spring 102 prevents the rattling of the second valve stem 100, and seal members 103 form an airtight seal between the top wall 85a and the first and second valve stems 99 and 100.

In the fuel reservoir apparatus M3 of this third embodiment, at the time of refuelling, the trap door 7 is rotated to cause the cam 10 to press the press portion 100a, so that the valve stem 98 of the closure valve 96 moves downwardly to cause the valve member 97 to close the passage hole 85f, thereby shutting-off the fuel vapor passage 20.

When pressure within the fuel tank 1 increases upon stopping the engine, the valve member 87 of the positive pressure valve 86 is disengaged from the peripheral edge portion of the passage hole 85f against the bias of the coil spring 89, so that fuel vapor V within the fuel tank 1 flows towards the canister 19 via the tank-side passageway 20a of the fuel vapor passage 20, the nipple 85h, the passage hole 85f, the nipple 85i and the canister-side passageway 20b of the fuel vapor passage 20, as indicated by dots-and-dash arrows in FIG. 10.

During the operation of the engine, the electromagnetic coil 94 is excited to cause the valve stem 93 to move upwardly against the bias of the coil spring 95, so that the valve member 92 is disengaged from the peripheral edge portion of the passage hole 85f. Therefore, as in the operative condition of the positive pressure valve 86, fuel vapor V within the fuel tank 1 flows towards the canister 19, thereby keeping pressure within the fuel tank 1 at a low level.

When pressure within the fuel tank 1 becomes negative, below the atmospheric pressure, the umbrella-shaped lip of the negative pressure valve 90 is disengaged from the partition wall 85e, so that the atmosphere at the canister side flows into the fuel tank 1 via the canister-side passageway 20*b* of the fuel vapor passage 20, the nipple 85*i*, the through hole 85*g*, the nipple 85*h* and the tank-side passageway 20*a* of the fuel vapor passage 20, thereby cancelling the negative pressure condition of the fuel tank 1.

Figure 11:
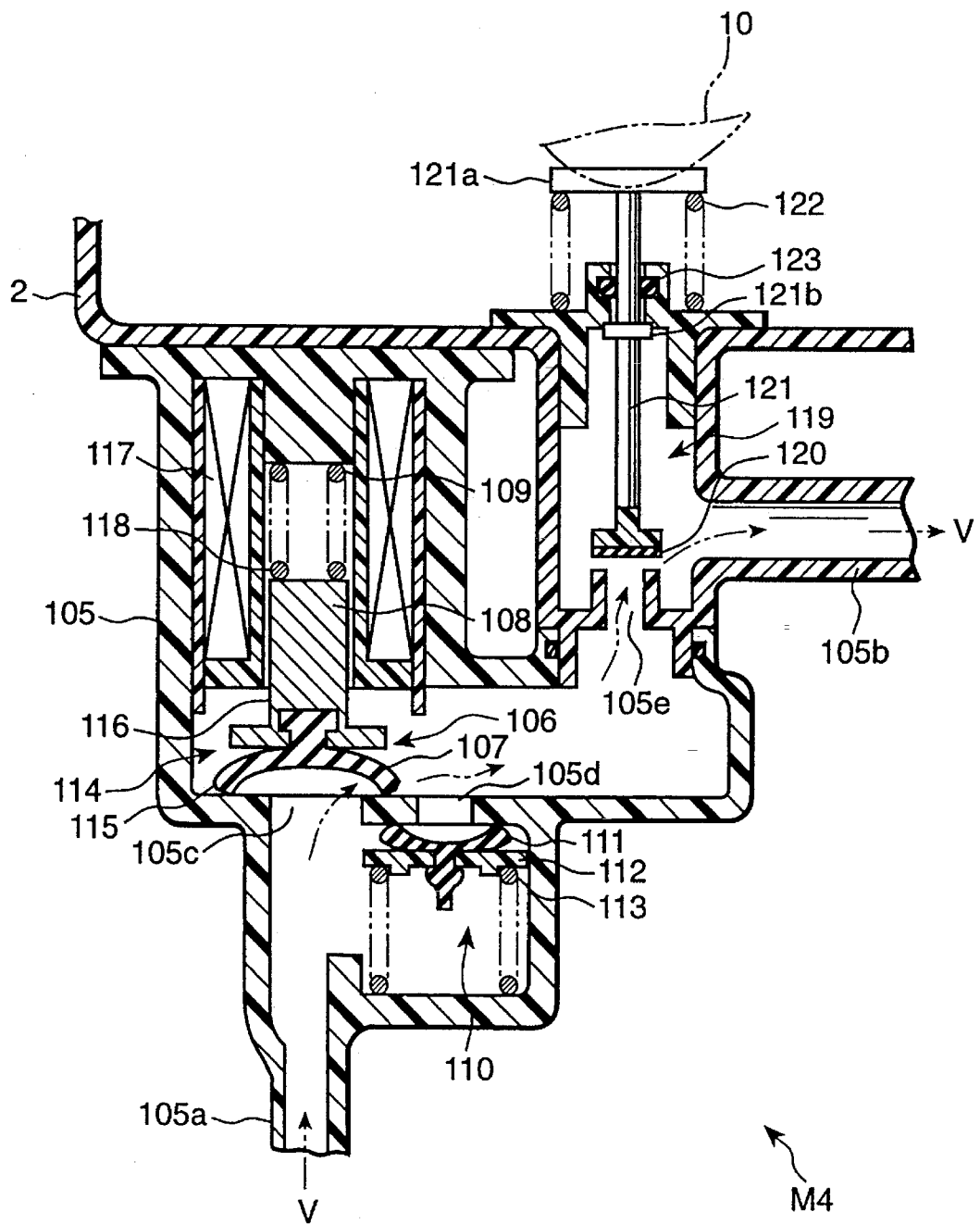
FIG. 11 is a schematic, cross-sectional view of an essential portion of a fourth embodiment of the invention.
Figure 12:
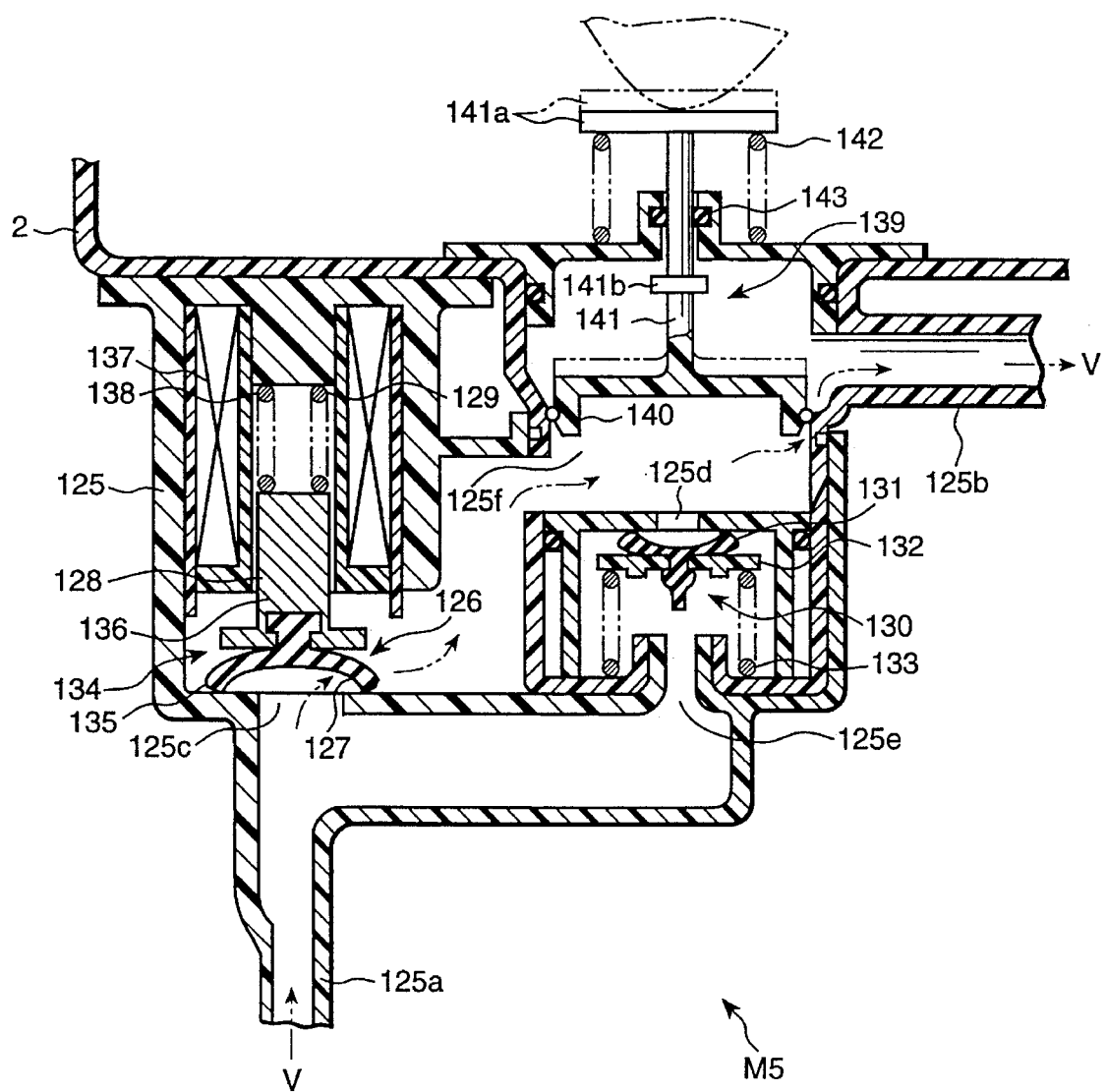
FIG. 12 is a cross-sectional view of an essential portion of a fifth embodiment of the invention at the time of refuelling.
Figure 13:
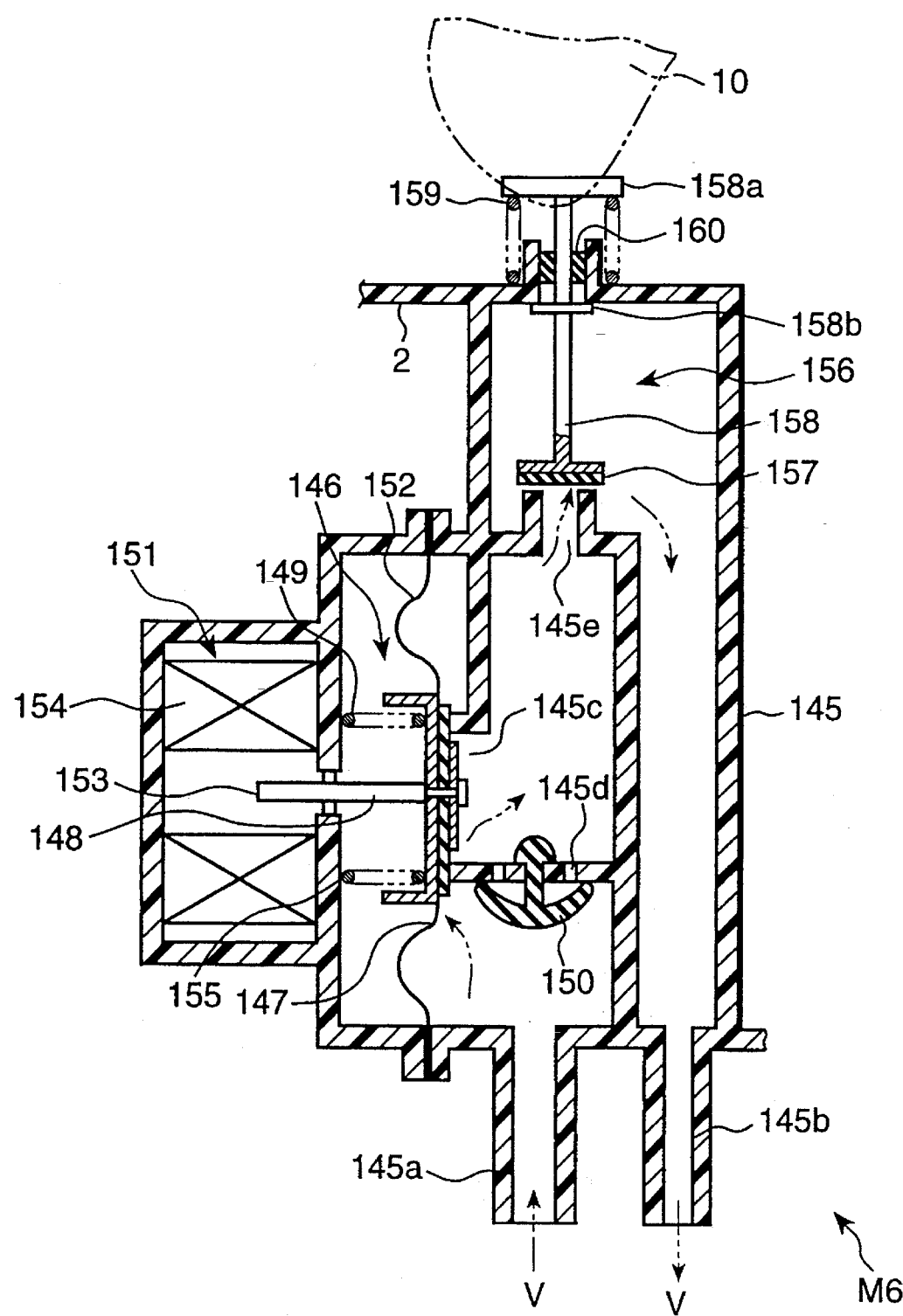
FIG. 13 is a schematic cross-sectional view of an essential portion of a sixth embodiment of the invention.

In the fuel reservoir apparatuses M1 to M3 of the first to third embodiments, while the positive pressure valve, the solenoid valve and the closure valves use the common parts, the closure valve may be provided at a position spaced apart from the positive pressure valve and the solenoid valve, as in fuel reservoir apparatuses M4, M5 and M6 of the fourth to sixth embodiments shown respectively in FIGS. 11, 12 and 13, and such arrangement enables achieving the effects of the invention.

In the fuel reservoir apparatus M4 of the fourth embodiment, shown in FIG. 11, a valve chamber 105 is provided in the filler neck 2, and has a nipple 105*a* connected to the tank-side passageway 20*a* of the fuel vapor passage 20, and a nipple 105*b* connected to the canister-side passageway 20*b* of the fuel vapor passage 20. The interior of this valve chamber 105 is divided by partition walls (whose reference numerals are not shown) having a passage hole 105*c*, a through hole 105*d* and a passage hole 105*e*, respectively. The interior of the valve chamber 105 is arranged such that if the passage hole 105*e* is closed, the communication between the nipples 105*a* and 105*b* is completely interrupted even when the passage hole 105*c* and the through hole 105*d* are both open. Further, if the passage hole 105*c* and the through hole 105*d* are both closed, the communication between the nipples 105*a* and 105*b* is completely interrupted even when the passage hole 105*e* is open.

A positive pressure valve 106 comprises a valve member 107 capable of closing the passage hole 105*c*, a valve stem 108 supporting the valve member 107 at its lower end, and a coil spring 109 urging the valve member 107 downwardly. A solenoid valve 114 comprises a valve member 115, a valve stem 116 and a coil spring 118 which also serve as the valve member 107, the valve stem 108 and the coil spring 109 of the positive pressure valve 106, respectively. By exciting an electromagnetic coil 117, the valve stem 116 is moved upwardly against the bias of the coil spring 118, so that the valve member 115 is disengaged from the passage hole 105*c*.

A negative pressure valve 110 comprises a valve member 111 capable of closing the through hole 105*d*, a support plate 112 supporting the valve member 111, and a coil spring 113 urging the valve member 111 upwardly.

A closure valve 119 comprises a valve member 120 capable of closing the passage hole 105*e*, a valve stem 121 which supports the valve member 120 and is projected from the valve chamber 105, and a coil spring 122 urging the valve member 120 upwardly. A press portion 121*a* for being pressed by the cam 10 is formed at an upper end of the valve stem 121, and a projection 121*b* is formed on the valve stem 121 intermediate opposite ends thereof, and is engageable with a peripheral wall (whose reference numeral is not shown) of the valve chamber 105 to prevent upward withdrawal of this valve stem. A seal member 123 forms an air-tight seal between the valve stem 121 and the peripheral wall of the valve chamber.

In the fuel reservoir apparatus M4 of this fourth embodiment, at the time of refuelling, the trap door 7 is rotated to cause the cam 10 to press the press portion 121*a*, so that the valve stem 121 of the closure valve 119 moves downwardly to cause the valve member 120 to close the passage hole 105*e*, thereby shutting-off the fuel vapor passage 20.

When pressure within the fuel tank 1 increases upon stopping the engine, the valve member 107 of the positive pressure valve 106 is disengaged from the peripheral edge portion of the passage hole 105*c* against the bias of the coil spring 109, so that fuel vapor V within the fuel tank 1 flows toward the canister 19 via the tank-side passageway 20*a* of the fuel vapor passage 20, the nipple 105*a*, the passage hole 105*c*, the passage hole 105*e*, the nipple 105*b* and the canister-side passageway 20*b* of the fuel vapor passage 20, as indicated by dots-and-dash arrows in FIG. 11.

During the operation of the engine, the electromagnetic coil 117 is excited to cause the valve stem 116 to move upwardly against the bias of the coil spring 118, so that the valve member 115 is disengaged from the peripheral edge portion of the passage hole 105*c*. Therefore, as in the operative condition of the positive pressure valve 106, fuel vapor V within the fuel tank 1 flows towards the canister 19, thereby keeping the pressure within the fuel tank 1 at a low level.

When pressure within the fuel tank 1 becomes negative, below the atmospheric pressure, the valve member 111 of the negative pressure valve 110 is disengaged from the through hole 105*d* against the bias of the coil spring 113, so that the atmosphere at the canister side flows into the fuel tank 1 via the canister-side passageway 20*b* of the fuel vapor passage 20, the nipple 105*b*, the passage hole 105*e*, the through hole 105*d*, the nipple 105*a* and the tank-side passageway 20*a* of the fuel vapor passage 20, thereby cancelling the negative pressure condition of the fuel tank 1.

In the fuel reservoir apparatus M5 of the fifth embodiment shown in FIG. 12, as in the fourth embodiment, a valve chamber 125 is provided in the filler neck 2, and has a nipple 125*a* connected to the tank-side passageway 20*a* of the fuel vapor passage 20, and a nipple 125*b* connected to the canister-side passageway 20*b* of the fuel vapor passage 20. The interior of this valve chamber is divided by partition walls (whose reference numerals are not shown) having a passage hole 125*c*, through holes 125*d* and 125*e* and a passage hole 125*f*, respectively. The interior of the valve chamber 125 is arranged such that if the passage hole 125*f* is closed, the communication between the nipples 125*a* and 125*b* is completely interrupted even when the passage hole 125*c* and the through hole 125*d* are both open. Further, if the passage hole 125*c* and the through hole 125*d* are both closed, the communication between the nipples 125*a* and 125*b* is completely interrupted even when the passage hole 125*f* is open.

A positive pressure valve 126 comprises a valve member 127 capable of closing the passage hole 125*c*, a valve stem 128 supporting the valve member 127 at its lower end, and a coil spring 129 urging the valve member 127 downwardly. A solenoid valve 134 comprises a valve member 135, a valve stem 136 and a coil spring 138 which also serve as the valve member 127, the valve stem 128 and the coil spring 129 of the positive pressure valve 126, respectively. By exciting an electromagnetic coil 137, the valve stem 136 is moved upwardly against the bias of the coil spring 138, so that the valve member 135 is disengaged from the passage hole 125*c*.

A negative pressure valve 130 comprises a valve member 131 capable of closing the through hole 125*d*, a support plate 132 supporting the valve member 131, and a coil spring 133 urging the valve member 131 upwardly.

A closure valve 139 comprises a valve member 140 of a generally disk-shape, capable of closing the passage hole 125*f*, a valve stem 141 which supports the valve member 140 and is projected from the valve chamber 125, and a coil spring 142 urging the valve member 140 upwardly. A press portion 141a for being pressed by the cam 10 is formed at an upper end of the valve stem 141, and a projection 141b is formed on the valve stem 141 intermediate opposite ends thereof, and is engageable with a peripheral wall (whose reference numeral is not shown) of the valve chamber 125 to prevent upward withdrawal of the valve stem 141. A seal member 143 forms a seal between the valve stem 141 and the peripheral wall of the valve chamber.

In the fuel reservoir apparatus M5 of this fifth embodiment, as in the fourth embodiment, at the time of refuelling, the trap door 7 is rotated to cause the cam 10 to press the press portion 141a, so that the valve stem 141 of the closure valve 139 moves downwardly to cause the valve member 140 to close the passage hole 125f, thereby shutting off the fuel vapor passage 20.

When pressure within the fuel tank 1 increases upon stopping the engine, the valve member 127 of the positive pressure valve 126 is disengaged from the peripheral edge portion of the passage hole 125c against the bias of the coil spring 129, so that fuel vapor V within the fuel tank 1 flows towards the canister 19 via the tank-side passageway 20a of the fuel vapor passage 20, the nipple 125a, the passage hole 125c, the passage hole 125f, the nipple 125b and the canister-side passageway 20b of the fuel vapor passage 20, as indicated by dots-and-dash arrows in FIG. 12.

During the operation of the engine, the electromagnetic coil 137 is excited to cause the valve stem 136 to move upwardly against the bias of the coil spring 138, so that the valve member 135 is disengaged from the peripheral edge portion of the passage hole 125c. Therefore, as in the operative condition of the positive pressure valve 126, fuel vapor V within the fuel tank 1 flows toward the canister 19, thereby keeping the pressure within the fuel tank 1 at a low level.

When pressure within the fuel tank 1 becomes negative, below the atmospheric pressure, the valve member 131 of the negative pressure valve 130 is disengaged from the through hole 125d against the bias of the coil spring 133, so that the atmosphere at the canister side flows into the fuel tank 1 via the canister-side passageway 20b of the fuel vapor passage 20, the nipple 125b, the passage hole 125f, the through holes 125d and 125e, the nipple 125a and the tank-side passageway 20a of the fuel vapor passage 20, thereby cancelling the negative pressure condition of the fuel tank 1.

In the fuel reservoir apparatus M6 of the sixth embodiment shown in FIG. 13, a valve member 147 of a positive pressure valve 146 comprises a diaphragm valve, and a negative pressure valve 150 comprises an umbrella-shaped member of rubber, as in the third embodiment.

In this fuel reservoir apparatus M6, as in the above embodiments, a valve chamber 145 is provided in the filler neck 2, and has a nipple 145a connected to the tank-side passageway 20a of the fuel vapor passage 20, and a nipple 145b connected to the canister-side passageway 20b of the fuel vapor passage 20. The interior of this valve chamber is divided by partition walls (whose reference numerals are not shown) having a passage hole 145c, a through hole 145d and a passage hole 145e, respectively. The interior of the valve chamber 145 is arranged such that if the passage hole 145e is closed, the communication between the nipples 145a and 145b is completely interrupted even when the passage hole 145c and the through hole 145d are both open, and that if the passage hole 145c and the through hole 145d are both closed, the communication between the nipples 145a and 145b is completely interrupted even when the passage hole 145e is open.

The positive pressure valve 146 comprises the valve member 147 in the form of a diaphragm valve capable of closing the passage hole 145c, a valve stem 148 supporting the valve member 147 at its right end, and a coil spring 149 urging the valve member 147 in a right-hand direction. A solenoid valve 151 comprises a valve member 152, a valve stem 153 and a coil spring 155 which also serve as the valve member 147, the valve stem 148 and the coil spring 149 of the positive pressure valve 146, respectively. By exciting an electromagnetic coil 154, the valve stem 153 is moved left against the bias of the coil spring 155, so that the valve member 152 is disengaged from the passage hole 145c.

The negative pressure valve 150 comprises an umbrella-like lip capable of closing the through hole 145d.

A closure valve 156 comprises a valve member 157 capable of closing the passage hole 145e, a valve stem 158 which supports the valve member 157 and is projected from the valve chamber 145, and a coil spring 159 urging the valve member 157 upwardly. A press portion 158a for being pressed by the cam 10 is formed at an upper end of the valve stem 158, and a projection 158b is formed on the valve stem 158 intermediate opposite ends thereof, and is engageable with a peripheral wall (whose reference numeral is not shown) of the valve chamber 145 to prevent upward withdrawal of the valve stem 158. A seal member 160 forms a seal between the valve stem 158 and the peripheral wall of the valve chamber.

In the fuel reservoir apparatus M6 of this sixth embodiment, at the time of refuelling, the trap door 7 is rotated to cause the cam 10 to press the press portion 158a, so that the valve stem 158 of the closure valve 156 moves downwardly to cause the valve member 157 to close the passage hole 145e, thereby shutting off the fuel vapor passage 20.

When pressure within the fuel tank 1 increases upon stopping the engine, the valve member 147 of the positive pressure valve 146 is disengaged from the peripheral edge portion of the passage hole 145c against the bias of the coil spring 149, so that fuel vapor V within the fuel tank 1 flows towards the canister 19 via the tank-side passageway 20a of the fuel vapor passage 20, the nipple 145a, the passage hole 145c, the passage hole 145e, the nipple 145b and the canister-side passageway 20b of the fuel vapor passage 20, as indicated by dots-and-dash arrows in FIG. 13.

During the operation of the engine, the electromagnetic coil 154 is excited to cause the valve stem 153 to move against the bias of the coil spring 155, so that the valve member 152 is disengaged from the peripheral edge portion of the passage hole 145c. Therefore, as in the operative condition of the positive pressure valve 146, fuel vapor V within the fuel tank 1 flows towards the canister 19, thereby keeping the pressure within the fuel tank 1 at a low level.

When pressure within the fuel tank 1 becomes negative, below the atmospheric pressure, the umbrella-like lip of the negative pressure valve 130 opens the through hole 145d, so that the atmosphere at the canister side flows into the fuel tank 1 via the canister-side passageway 20b of the fuel vapor passage 20, the nipple 145b, the passage hole 145e, the through hole 145d, the nipple 145a and the tank-side passageway 20a of the fuel vapor passage 20, thereby cancelling the negative pressure condition of the fuel tank 1.

Figure 14:
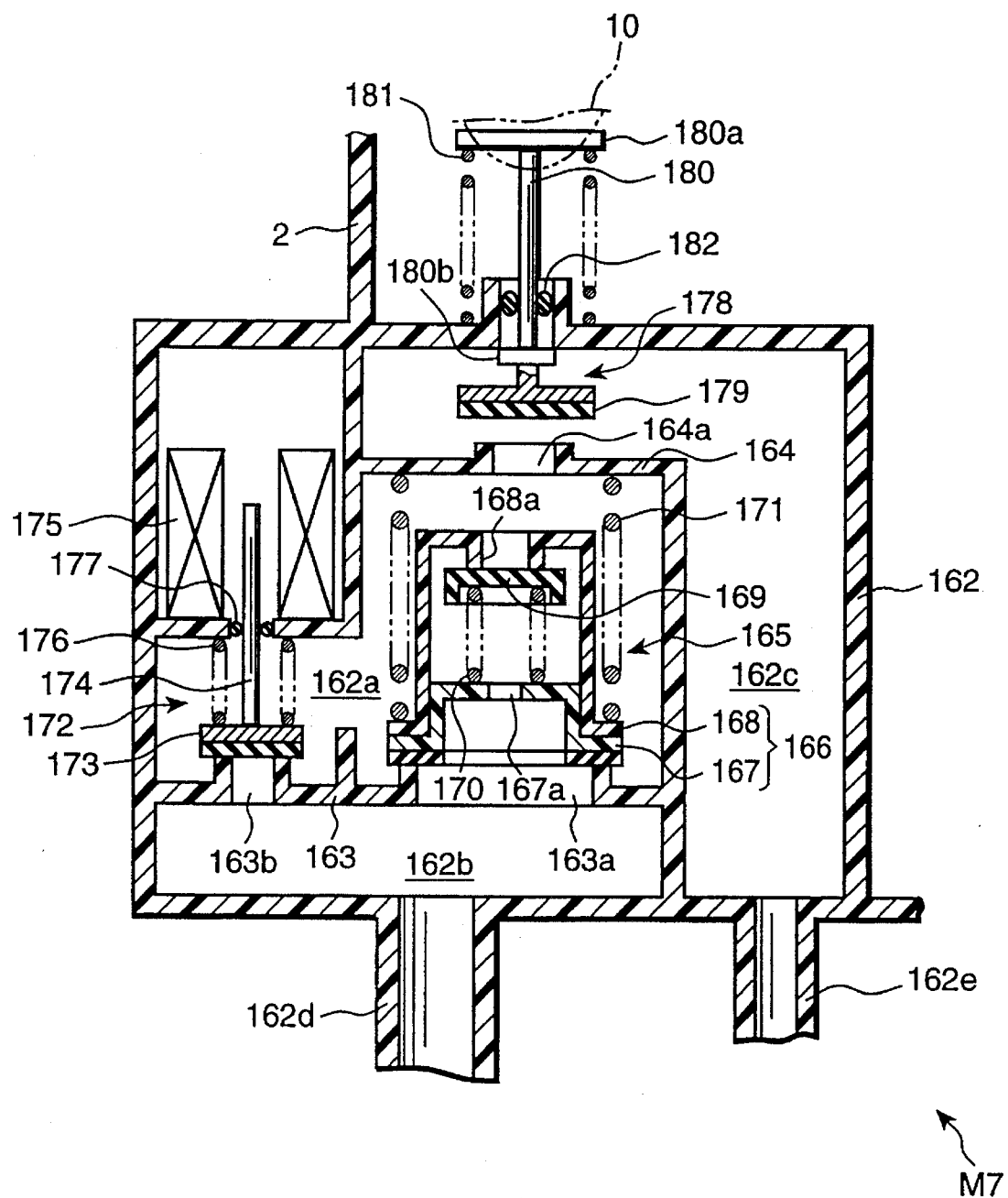
FIG. 14 is a schematic, cross-sectional view of an essential portion of a seventh embodiment of the invention.

In the fuel reservoir apparatuses M4, M5 and M6 of the fourth, fifth and sixth embodiments, while the positive pressure valve and the solenoid valve use the common parts, the positive pressure valve and the solenoid valve may be provided separately from each other as in a fuel reservoir apparatus M7 of a seventh embodiment shown in FIG. 14. Such construction can attain the effects of the invention.

In the fuel reservoir apparatus M7 (FIG. 14) of this seventh embodiment, the interior of a valve chamber 162 provided in the filler neck 2 is divided by partition walls 163 and 164 into three chambers, that is, a main valve chamber 162a, an inflow chamber 162b and an outflow chamber 162c. The inflow chamber 162b has a nipple 162d connected to the tank-side passageway 20a of the fuel vapor passage 20, and the outflow chamber 162c has a nipple 162e connected to the canister-side passageway 20b of the fuel vapor passage 20. Two passage holes 163a and 163b are formed through the partition wall 163, and one passage hole 164a is formed through the partition wall 164.

A positive pressure valve with a negative pressure valve, that is, a positive/negative pressure valve 165, is provided in the main valve chamber 162a in the vicinity of the passage hole 163a in the partition wall 163. This positive/negative pressure valve 165 comprises a positive pressure valve member 166 capable of closing the passage hole 163a, and a coil spring 171 urging the valve member 166 towards the passage hole 163a. The positive pressure valve member 166 comprises a valve element 167 and a support plate 168 supporting the valve element 167, and communication holes 167a and 168a are formed through the valve element 167 and the support plate 168, respectively. A valve plate 169, serving as a negative pressure valve member constituting the negative pressure valve, is provided in the vicinity of the communication hole 167a, and this valve plate 169 is urged by a coil spring 170 in a direction to close the communication hole 168a.

A solenoid valve 172 is provided in the main valve chamber 162a in the vicinity of the passage hole 163b in the partition wall 163. This solenoid valve 172 comprises a valve member 173 capable of closing the passage hole 163b, a valve stem 174 supporting the valve member 173 at its lower end, and a coil spring 176 urging the valve member 173 in a direction to close the passage hole 163b. By exciting an electromagnetic coil 175 provided around a proximal portion of the valve stem 174, the valve stem 174 is moved upwardly against the bias of the coil spring 176, so that the valve member 173 opens the passage hole 163b. A seal member 177 is sealingly engaged with the periphery of the valve stem 174.

A closure valve 178 comprises a valve member 179 capable of closing the passage hole 164a in the partition wall 164, a valve stem 180 which supports the valve member 179 at its lower end and is projected upwardly from the valve chamber 162, and a coil spring 181 urging the valve member 179 upwardly.

A disk-shaped press portion 180a for being pressed by the cam 10 is formed at an upper end of the valve stem 180, and a projection 180b is formed on the valve stem 180 intermediate opposite ends thereof, and is engageable with a peripheral wall of the valve chamber 162 to prevent upward withdrawal of the valve stem 180. A seal member 182 sealingly engages the periphery of the valve stem 180.

In the fuel reservoir apparatus M7 of this seventh embodiment, at the time of refuelling, the trap door 7 is rotated to cause the cam 10 to press the press portion 180a, so that the valve stem 180 of the closure valve 178 moves downwardly to cause the valve member 179 to close the passage hole 164a, thereby interrupting the communication between the nipples 162d and 162e within the valve chamber 162, thus shutting-off the fuel vapor passage 20.

When pressure within the fuel tank 1 increases upon stopping the engine, the positive pressure valve member 166 of the positive/negative pressure valve 165 is disengaged from the peripheral edge portion of the passage hole 163a against the bias of the coil spring 171, so that fuel vapor V within the fuel tank 1 flows towards the canister 19 via the tank-side passageway 20a of the fuel vapor passage 20, the nipple 162d, the inflow chamber 162b, the passage hole 163a, the main valve chamber 162a, the passage hole 164a, the outflow chamber 162c, the nipple 162e, and the canister-side passageway 20b of the fuel vapor passage 20.

During the operation of the engine, the electromagnetic coil 175 of the solenoid valve 172 is excited to cause the valve stem 174 to move upwardly against the bias of the coil spring 176, so that the valve member 173 is disengaged from the peripheral edge portion of the passage hole 163b. Therefore, fuel vapor V within the fuel tank 1 flows towards the canister 19 via the tank-side passageway 20a of the fuel vapor passage 20, the nipple 162d, the inflow chamber 162b, the passage hole 163b, the main valve chamber 16a, the passage hole 164a, the outflow chamber 162c, the nipple 162e and the canister-side passageway 20b of the fuel vapor passage 20, thereby keeping the pressure within the fuel tank 1 at a low level.

When pressure within the fuel tank 1 becomes negative, below the atmospheric pressure, the valve plate 169 is disengaged from the communication hole 168a against the bias of the coil spring 170, so that the atmosphere at the canister side flows into the fuel tank 1 via the canister-side passageway 20b of the fuel vapor passage 20, the nipple 162e, the inflow chamber 162c, the passage hole 164a, the main valve chamber 162a, the communication holes 168a and 167a, the outflow chamber 162b, the nipple 162d and the tank-side passageway 20a of the fuel vapor passage 20, thereby cancelling the negative pressure condition of the fuel tank 1.

Figure 15:
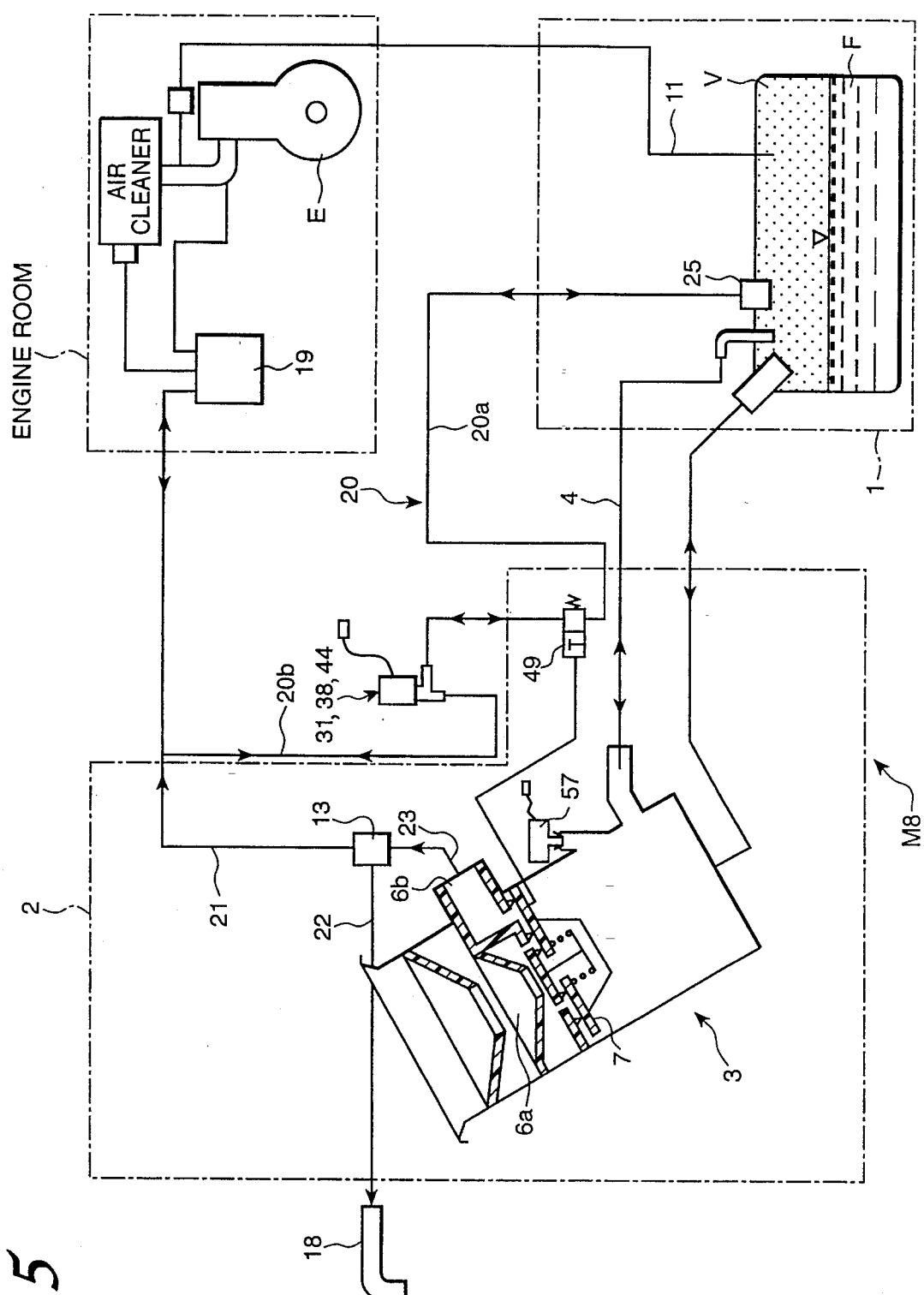
FIG. 15 is a system diagram of an eighth embodiment of the invention, with a fuel vapor passage shown schematically.

Referring to a fuel reservoir apparatus M8 of an eighth embodiment of FIGS. 15 and 16, using the system diagram of FIG. 2, a closure valve 49 is provided in the filler neck 2 in such a manner that this closure valve 49 is disposed upstream of a positive pressure valve 31, a negative pressure valve 38 and a solenoid valve 44 with respect to the fuel tank 1. The reference numerals in FIG. 16 are identical respectively to those in FIG. 11 and denote corresponding parts, respectively. The operation of the eighth embodiment is basically similar to those of the above embodiments.

What is claimed is:

1. A fuel reservoir apparatus comprising:

a fuel tank constructed and arranged to store fuel to be supplied to an engine of an automobile;

a canister constructed and arranged to absorb fuel vapor;

a fuel vapor passage connected between said fuel tank and said canister;

a pressure control valve having a valve member and a valve stem coupled to said valve member, said pressure control valve being provided in said fuel vapor passage including biasing means for biasing said valve member to control the pressure within said fuel tank;

valve means, including said valve stem, provided in said fuel vapor passage constructed and arranged to open during an operation of the engine to permit a flow of fuel vapor towards said canister; and a closure valve provided in said fuel vapor passage constructed and arranged to close said fuel vapor passage when fuel is supplied to said fuel tank, wherein said valve stem of said pressure control valve defines an armature of said valve means.

2. A fuel reservoir apparatus according to claim 1, further comprising an overflow device provided in a flow passageway, extending from said fuel tank to said canister, said overflow device being constructed and arranged to allow the fuel vapor to flow there through towards said canister when said closure valve closes said fuel vapor passage, said overflow device having a float valve which closes said flow passageway when the fuel flows into said overflow device, and causes excess fuel to flow to the exterior of said fuel reservoir apparatus.

3. A fuel reservoir apparatus according to claim 1, wherein said pressure control valve comprises a positive pressure valve constructed and arranged to permit the fuel vapor to flow towards said canister when the pressure within said fuel tank exceeds a predetermined level upon stopping the engine, and a negative pressure valve constructed and arranged to permit for atmospheric pressure from said canister to flow to said fuel tank when pressure within said fuel tank becomes negative, below the atmospheric pressure.

4. A fuel reservoir apparatus according to claim 3, wherein said positive pressure valve, said negative pressure valve, said valve means and said closure valve are provided in a valve chamber defined in said fuel vapor passage.

5. A fuel reservoir apparatus according to claim 4, wherein said valve chamber includes at least one wall, said positive pressure valve, said negative pressure valve, said valve means and said closure valve being mounted on said at least one wall in a generally assimilated manner.

6. A fuel reservoir apparatus according to claim 4, wherein said positive pressure valve, said valve means and said closure valve have a common valve member and a common valve stem supporting said valve member; said positive pressure valve and said valve means having a common spring urging said valve member into sealing engagement with a valve seat; pressure within said fuel tank above said predetermined level acting on said valve member of said positive pressure valve to disengage said valve member from engagement with said valve seat against the bias of said spring; said valve means including an electromagnetic coil which is excited during the operation of the engine to move said valve stem against the bias of said spring so as to disengage said valve member from engagement with said valve seat; said closure valve having a press portion connected to said valve stem; and said press portion being capable of being pressed to move said valve stem to bring said valve member into sealing engagement with said valve seat when fuel is supplied to said fuel tank.

7. A fuel reservoir apparatus according to claim 6, wherein said valve chamber is divided into a first and a second chamber by a partition wall having a first and a second through hole; a peripheral edge portion of said first through hole defining said valve seat; and said negative pressure valve comprising a second valve member and a spring urging said second valve member towards said partition wall to thereby close said second through hole, wherein said second valve member of said negative pressure valve is moved away from said partition wall to open said second through hole when pressure within said fuel tank becomes negative, below atmospheric pressure.

8. A fuel reservoir apparatus according to claim 6, wherein said valve chamber is defined by a top wall, a bottom wall and a peripheral wall extending between said top wall and said bottom wall; a tubular partition wall being defined on an inner surface of said bottom wall; said tubular partition wall having a through hole; said valve member being a diaphragm valve member mounted on an inner periphery of said peripheral wall to divide said valve chamber into an upper and a lower chamber; said diaphragm valve member being urged by said spring into sealing engagement with an upper end of said tubular partition wall which defines as said valve seat; and said negative pressure valve comprising an elastic valve member mounted on said partition wall constructed and arranged to close said through hole, wherein said elastic valve member of said negative pressure valve is deformed to open said through hole when pressure within said fuel tank becomes negative, below atmospheric pressure.

9. A fuel reservoir apparatus according to claim 4, wherein said positive pressure valve and said valve means have a common first valve member, a common first valve stem supporting said valve member, and a common first spring urging said valve member into sealing engagement with a first valve seat;

said closure valve comprising a second valve member, a second valve stem supporting said second valve member, and a second spring urging said second valve member out of sealing engagement with a second valve seat;

pressure within said fuel tank above said predetermined level acting on said first valve member of said positive pressure valve to disengage said first valve member from engagement with said first valve seat against the bias of said first spring; said valve means having an electromagnetic coil which is excited during the operation of the engine to move said first valve stem against the bias of said first spring so as to disengage said first valve member from engagement with said first valve seat;

said closure valve having a press portion formed on said second valve stem; said press portion being constructed and arranged to be pressed to move said second valve stem to bring said second valve member into sealing engagement with said second valve seat when fuel is supplied to said fuel tank; and said negative pressure valve comprising a third valve member normally held in engagement with a third valve seat, wherein said third valve member is disengaged from said third valve seat when pressure within said fuel tank becomes negative, below atmospheric pressure.

10. A fuel reservoir apparatus according to claim 9, wherein said fuel vapor passage has a tank-side passageway leading to said fuel tank, and a canister-side passageway leading to said canister; said valve chamber being interposed between said two passageways; said valve chamber having a first nipple connected to said tank-side passageway, and a second nipple connected to said canister-side passageway; and said valve chamber having partition wall means therein which has first, second and third through holes whose peripheral edge portions thereof define said first, second and third valve seats, respectively, wherein if said second through hole is closed by said second valve member of said closure valve, communication between said first and second nipples is interrupted even when said first and third through holes are open, and wherein if said first and third through holes are both closed, communication between said first and second nipples is interrupted even when said second through hole is open.

11. A fuel reservoir apparatus according to claim 10, wherein said first valve member comprises a diaphragm valve member, and said third valve member comprises an elastic valve member which is constructed and arranged to deform to open said third through hole when pressure within said fuel tank becomes negative, below atmospheric pressure.

12. A fuel reservoir apparatus according to claim 3, wherein said closure valve is disposed upstream of said positive pressure valve, said negative pressure valve and said valve means with respect to said fuel tank.

* * * * *